United States Patent
Oka et al.

(10) Patent No.: US 11,254,352 B2
(45) Date of Patent: Feb. 22, 2022

(54) ROTARY ELECTRIC MACHINE CONTROL DEVICE, AND ELECTRIC POWER STEERING DEVICE USING THE SAME

(71) Applicant: DENSO CORPORATION, Kariya (JP)

(72) Inventors: Atsuko Oka, Kariya (JP); Shuji Kuramitsu, Kariya (JP); Koichi Nakamura, Kariya (JP); Nobuyori Nakajima, Kariya (JP); Go Endoh, Kariya (JP); Yosuke Ogi, Kariya (JP)

(73) Assignee: DENSO CORPORATION, Kariya (JP)

( * ) Notice: Subject to any disclaimer, the term of this patent is extended or adjusted under 35 U.S.C. 154(b) by 452 days.

(21) Appl. No.: 16/405,040

(22) Filed: May 7, 2019

(65) Prior Publication Data
US 2019/0256129 A1    Aug. 22, 2019

Related U.S. Application Data

(63) Continuation of application No. PCT/JP2017/040383, filed on Nov. 9, 2017.

(30) Foreign Application Priority Data

Nov. 11, 2016  (JP) .............................. JP2016-220473
Oct. 31, 2017  (JP) .............................. JP2017-209906

(51) Int. Cl.
*H02P 1/46*       (2006.01)
*B62D 5/04*       (2006.01)
(Continued)

(52) U.S. Cl.
CPC ........... *B62D 5/0463* (2013.01); *B62D 5/046* (2013.01); *H02K 11/27* (2016.01); *H02P 6/04* (2013.01);
(Continued)

(58) Field of Classification Search
CPC ....... B62D 5/0463; H02K 11/27; H02P 21/22; H02P 29/40; H02P 6/04; H02P 25/22; H02P 2006/045; H02P 29/028; H02P 7/00
See application file for complete search history.

(56) References Cited

U.S. PATENT DOCUMENTS 7,433,767 B2   10/2008  Takeuchi et al.
9,214,886 B2   12/2015  Suzuki
2019/0241214 A1*  8/2019  Oka .................... B62D 6/10

FOREIGN PATENT DOCUMENTS

JP    3839358 B2    11/2006
JP    2011-195089 A    10/2011
JP    5672278 B2    2/2015

* cited by examiner

*Primary Examiner* — Karen Masih
(74) *Attorney, Agent, or Firm* — Maschoff Brennan

(57) ABSTRACT

A rotary electric machine control device for controlling driving of a rotary electric machine including a plurality of winding sets, includes: a plurality of drive circuits; and a plurality of control units, each of which includes: an individual current limit value calculation unit; a current limit value calculation unit; and a control signal calculation unit. The current limit value calculation unit switches between a current limit value sharing mode and a current limit value non-sharing mode. An electric power steering device includes: the rotary electric machine control device; the rotary electric machine that outputs an assist torque for assisting a steering operation of a steering wheel by a driver; and a power transmission unit that transmits a driving force of the rotary electric machine to a drive target.

10 Claims, 32 Drawing Sheets

(51) Int. Cl.
*H02K 11/27* (2016.01)
*H02P 29/40* (2016.01)
*H02P 6/04* (2016.01)
*H02P 21/22* (2016.01)
*H02P 29/60* (2016.01)
*H02P 29/028* (2016.01)
*H02P 21/00* (2016.01)
*H02P 25/22* (2006.01)

(52) U.S. Cl.
CPC .......... *H02P 21/0003* (2013.01); *H02P 21/22* (2016.02); *H02P 21/50* (2016.02); *H02P 25/22* (2013.01); *H02P 29/028* (2013.01); *H02P 29/40* (2016.02); *H02P 29/60* (2016.02); *H02P 2006/045* (2013.01)

ROTARY ELECTRIC MACHINE CONTROL DEVICE, AND ELECTRIC POWER STEERING DEVICE USING THE SAME

CROSS REFERENCE TO RELATED APPLICATION

The present application is a continuation application of International Patent Application No. PCT/JP2017/040383 filed on Nov. 9, 2017, which designated the U.S. and claims the benefit of priorities from Japanese Patent Applications No. 2016-220473 filed on Nov. 11, 2016, and No. 2017-209906 filed on Oct. 31, 2017. The entire disclosures of all of the above applications are incorporated herein by reference.

TECHNICAL FIELD

The present disclosure relates to relates to a rotary electric machine control device and an electric power steering device using the control device.

BACKGROUND

Steer-by-wire steering control devices and electric power steering devices have been known. For example, two ECUs are provided, a first ECU controls a first motor and a reaction force application motor, and a second ECU controls a second motor and a reaction force application motor.

SUMMARY

According to an aspect of the present disclosure, a rotary electric machine control device for controlling driving of a rotary electric machine including a plurality of winding sets, includes: a plurality of drive circuits; and a plurality of control units, each of which includes: an individual current limit value calculation unit; a current limit value calculation unit; and a control signal calculation unit. The current limit value calculation unit switches between a current limit value sharing mode and a current limit value non-sharing mode.

According to another aspect of the present disclosure, an electric power steering device includes: the rotary electric machine control device; the rotary electric machine that outputs an assist torque for assisting a steering operation of a steering wheel by a driver; and a power transmission unit that transmits a driving force of the rotary electric machine to a drive target.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
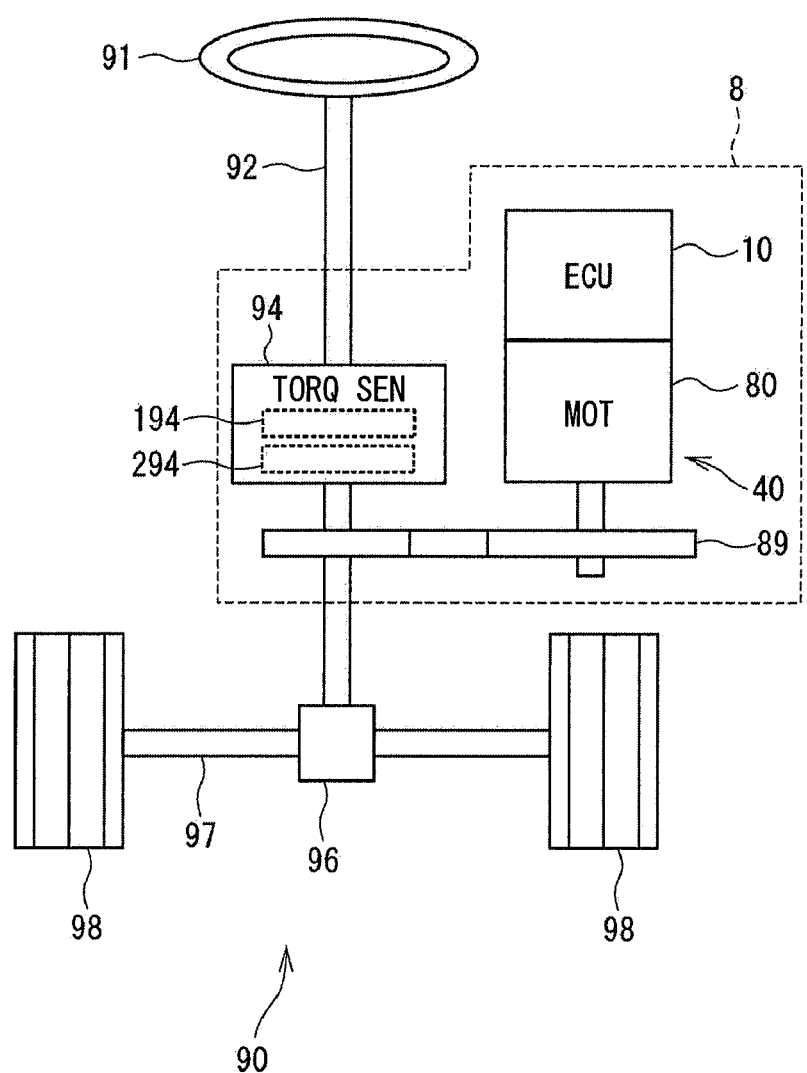
FIG. 1 is a schematic configuration diagram of a steering system according to a first embodiment.

In the case where two ECUs are provided, even when a current command value is calculated based on the same torque detection value, a current limit value may differ due to a difference in power supply voltage or temperature of each system. If the current limit value is different, the current command value is different, which may cause noise or vibration.

A rotary electric machine control device capable of reducing vibration and noise, and an electric power steering device using the control device are provided.

A rotary electric machine control device controls driving of a rotary electric machine including a plurality of winding sets. The rotary electric machine control device includes a plurality of drive circuits and a plurality of control units. Each control unit includes: an individual current limit value calculation unit; a current limit value calculation unit; and a control signal calculation unit. A unit of components including one of the winding sets and a corresponding one of the drive circuits is defined as a system. The individual current limit value calculation unit calculates an individual current limit value as a value relating to a current limitation for each system. The current limit value calculation unit sets a current limit value based on the individual current limit value. The control signal calculation unit calculates a control signal based on a current command value calculated according to the current limit value, and outputs the control signal to a corresponding drive circuit.

The current limit value calculation unit switches between a current limit value sharing mode for matching the current limit values between a host system and another system and a current limit value non-sharing mode for setting the current limit values independently in the host system and the other system.

With the setting of the current limit value sharing mode, a variation in the current command value between the systems attributable to a variation in the current limit value can be reduced, thereby being capable of reducing vibration and noise. Further, with the switching between the current limit value sharing mode and the current limit value non-sharing mode, the driving of the rotary electric machine can be appropriately controlled in accordance with the state of the system or the like.

Hereinafter, a rotary electric machine control device and an electric power steering device according to the present disclosure will be described with reference to the drawings. Hereinafter, in a plurality of embodiments, substantially the same components are denoted by identical reference numerals, and a description of the same components will be omitted.

First Embodiment

A first embodiment is shown in FIGS. 1 to 15. As shown in FIG. 1, an ECU 10 as a rotary electric machine control device according to the present embodiment is applied to, for example, an electric power steering device 8 for assisting a steering operation of a vehicle together with a motor 80 as a rotary electric machine. FIG. 1 shows an overall configuration of a steering system 90 including the electric power steering device 8.

FIG. 1 shows a configuration of a steering system 90 including the electric power steering device 8. The steering system 90 includes a steering wheel 91 as a steering member, a steering shaft 92, a pinion gear 96, a rack shaft 97, wheels 98, an electric power steering device 8, and the like.

The steering wheel 91 is connected to a steering shaft 92. The steering shaft 92 is provided with a torque sensor 94 for detecting the steering torque Ts. A pinion gear 96 is provided at a tip of the steering shaft 92. The pinion gear 96 meshes with a rack shaft 97. A pair of wheels 98 is connected to both ends of the rack shaft 97 through tie rods or the like.

When the driver rotates the steering wheel 91, the steering shaft 92 connected to the steering wheel 91 rotates. A rotational movement of the steering shaft 92 is converted into a linear movement of the rack shaft 97 by the pinion gear 96. The pair of wheels 98 are steered to an angle corresponding to the displacement amount of the rack shaft 97.

The electric power steering device 8 includes a drive device 40 having the motor 80 and the ECU 10, and a reduction gear 89 as a power transmission portion that reduces the rotation of the motor 80 and transmits the reduced rotation to the steering shaft 92. The electric power steering device 8 according to the present embodiment is a so-called "column assist type", but may be a so-called "rack assist type" which transmits the rotation of the motor 80 to the rack shaft 97. In the present embodiment, the steering shaft 92 corresponds to a "driven target".

The motor 80 outputs an assisting torque for assisting the driver to steer the steering wheel 91, and is driven by electric power supplied from batteries 191 and 291 (refer to FIG. 8) as a power supply to rotate the reduction gear 89 forward and backward. The motor 80 is a three-phase brushless motor and includes a rotor 860 and a stator 840 (refer to FIG. 6).

Figure 2:
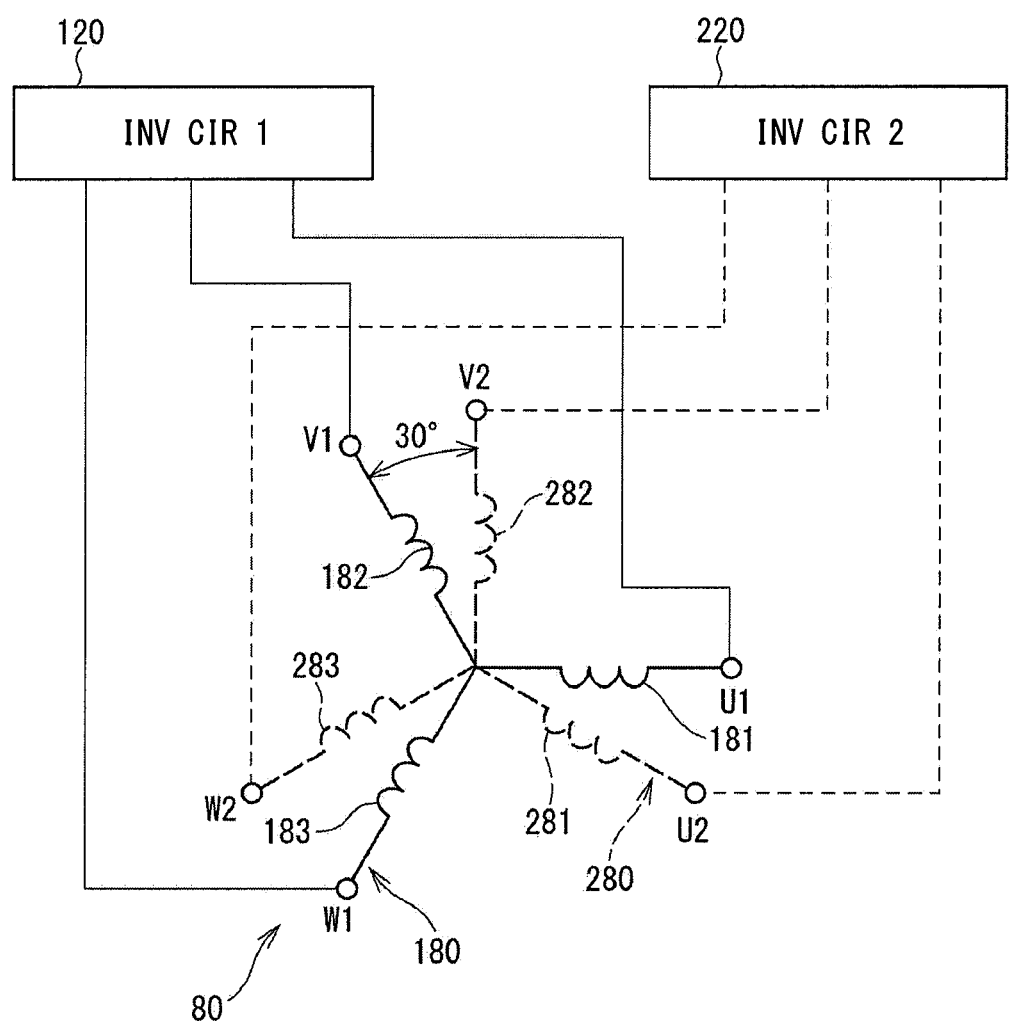
FIG. 2 is a schematic diagram showing a motor winding according to the first embodiment.

As shown in FIG. 2, the motor 80 has a first motor winding 180 and a second motor winding 280 as a winding set. The first motor winding 180 includes a U1 coil 181, a V1 coil 182, and a W1 coil 183. The second motor winding 280 includes a U2 coil 281, a V2 coil 282, and a W2 coil 283. In the figure, the first motor winding 180 is referred to as "motor winding 1" and the second motor winding 280 is referred to as "motor winding 2". In other configurations to be described later, a "first" is described as a subscript "1" and a "second" is described as a subscript "2" as appropriate in the drawings.

Figure 3:
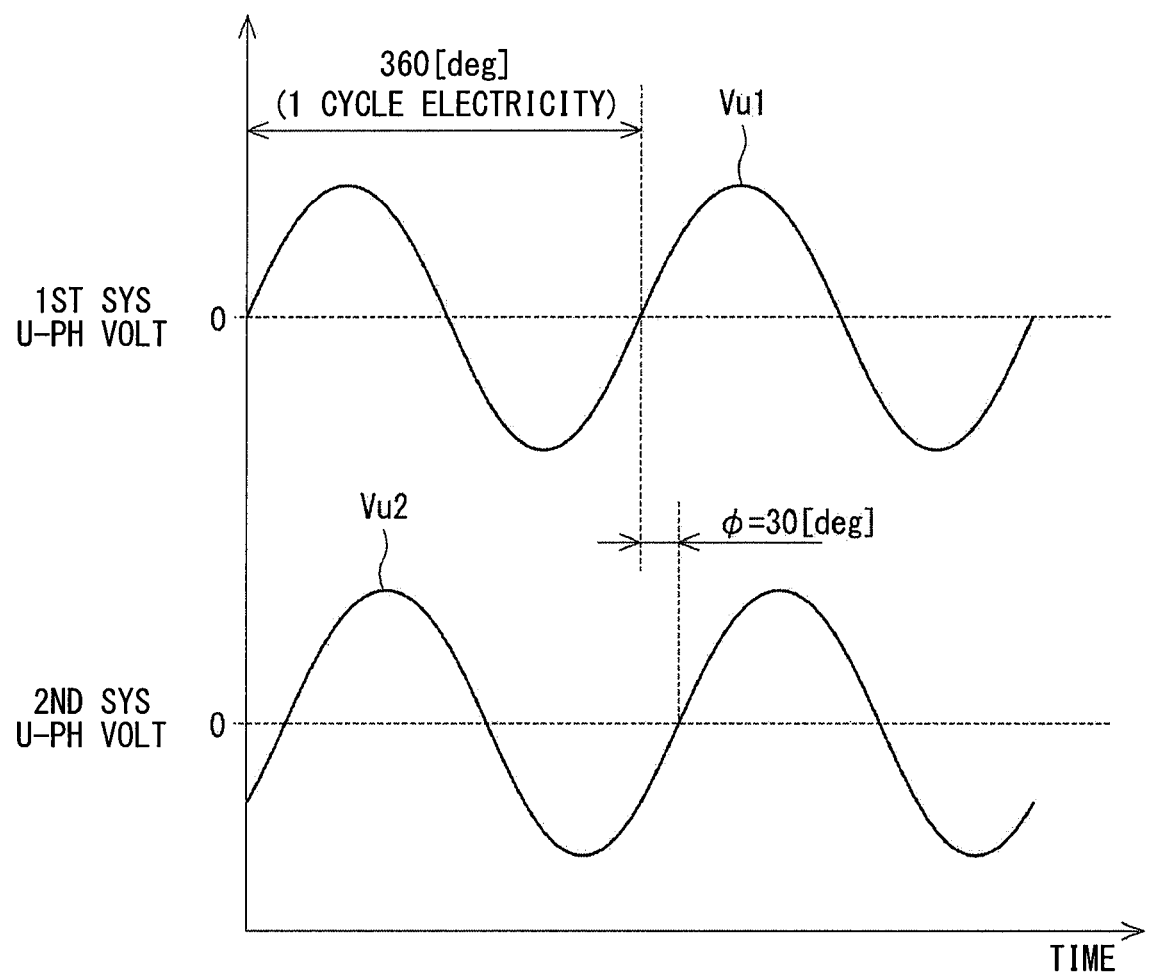
FIG. 3 is a time chart illustrating an energization phase difference according to the first embodiment.
Figure 4:
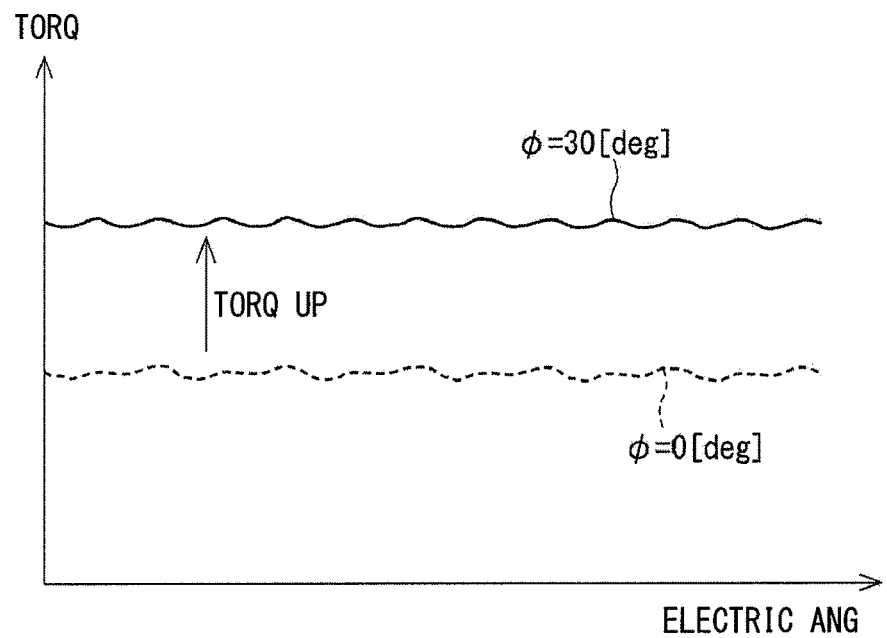
FIG. 4 is an illustrative diagram illustrating the torque improvement by the phase difference energization in the first embodiment.
Figure 5:
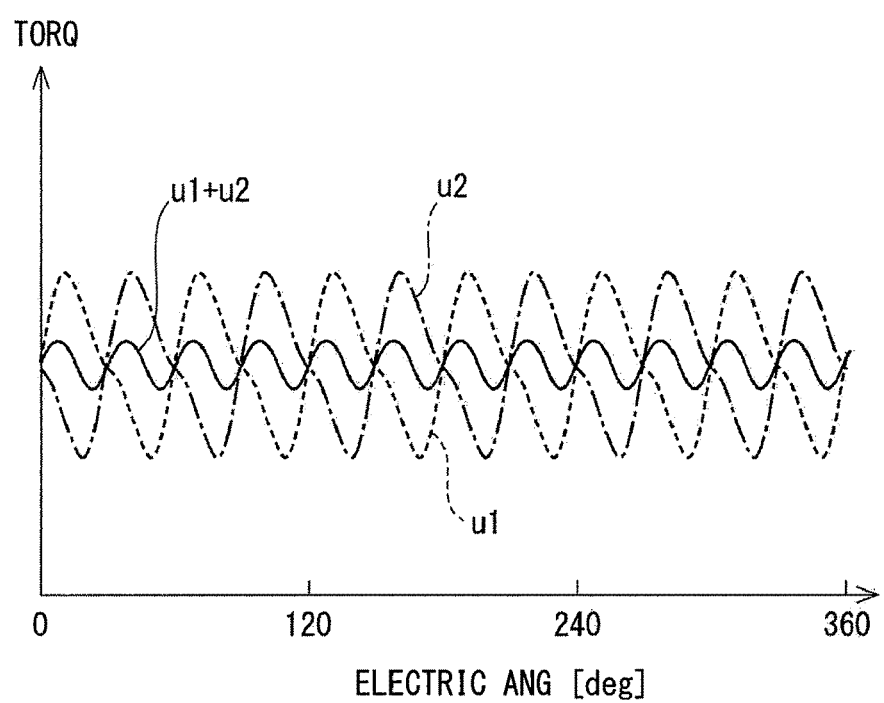
FIG. 5 is an illustrative diagram illustrating a torque ripple according to the first embodiment.

As shown in FIG. 2, the first motor winding 180 and the second motor winding 280 have the same electrical characteristics, and are wound to cancel each other by shifting the common stator 840 by an electrical angle of 30 [deg] from each other, as shown in FIG. 3 of Japanese Patent Publication No. 5672278, for example. In response to the above configuration, the motor windings 180 and 280 are controlled to be energized by a phase current whose phase Φ is shifted by 30 [deg] (refer to FIG. 3). FIG. 3 illustrates a U-phase voltage Vu1 of the first system and a U-phase voltage Vu2 of the second system. As shown in FIG. 4, the output torque is improved by optimizing the energization phase difference. In addition, as shown in FIG. 5, a sixth-order torque ripple can be reduced by setting the energization phase difference to an electric angle 30 [deg] (refer to Expression (i)).

$$\sin 6(\omega t) + \sin 6(\omega t + 30) = 0 \qquad (i)$$

Furthermore, since the currents are averaged by the phase difference energization, the cancellation merit of noise and vibration can be maximized. In addition, since the heat generation is also averaged, an error between the systems depending on a temperature, such as a detection value of each sensor and a torque can be reduced and a current-carriable amount can be averaged. Hereinafter, noise and vibration are referred to as "NV" as appropriate.

Hereinafter, a combination of a first inverter circuit 120, a first control unit 131, and so on involved in the drive control of the first motor winding 180 is referred to as a first system L1, and a combination of a second inverter circuit 220, a second control unit 231, and so on involved in the drive control of the second motor winding 280 is referred to as a second system L2. In the present embodiment, the inverter circuits 120 and 220 correspond to "drive circuits". In addition, the components involved in the first system L1 are mainly numbered in the order of 100, and the components involved in the second system L2 are mainly numbered in the order of 200. In the first system L1 and the second system L2, the same components are numbered so that the last two digits are the same.

Figure 6:
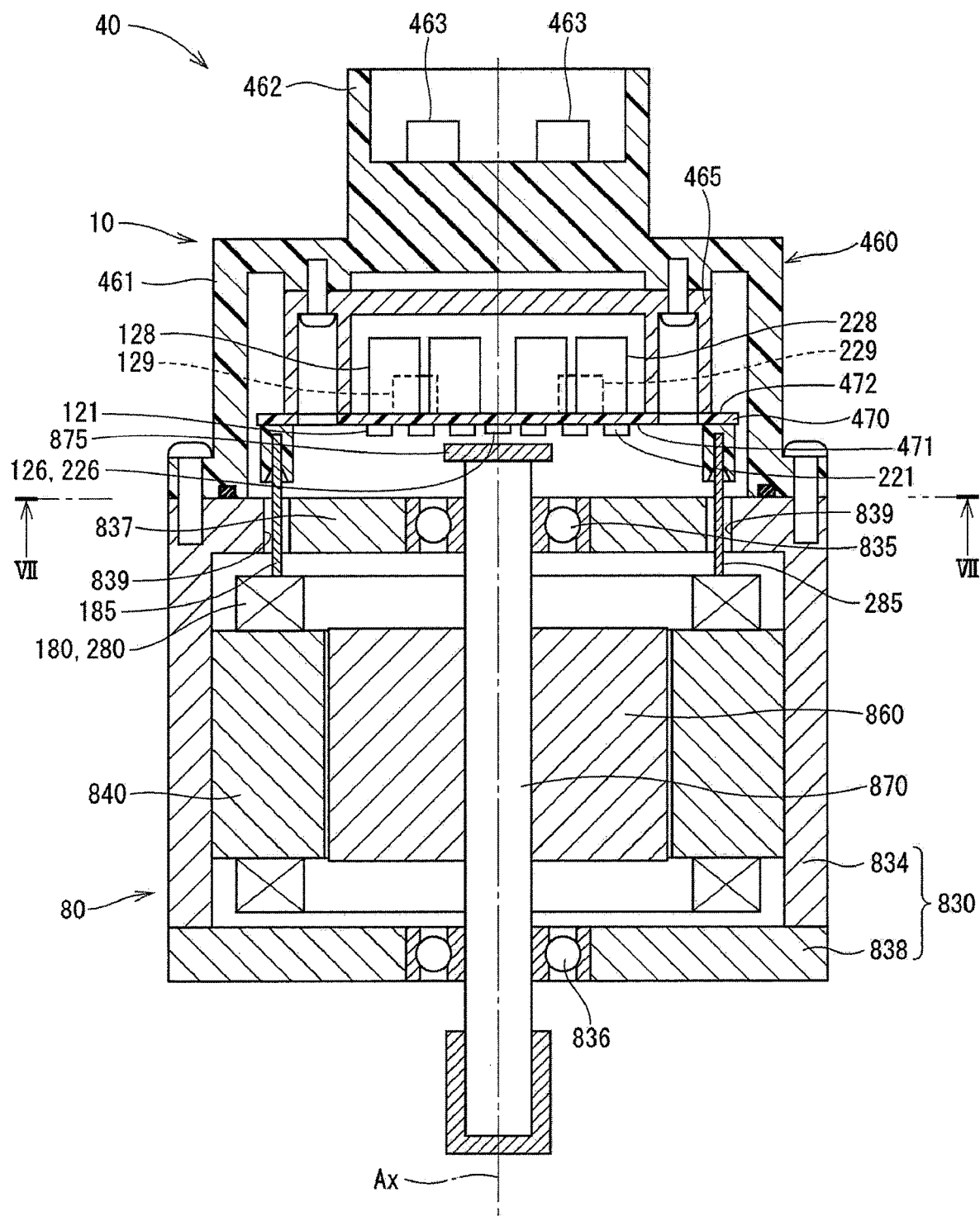
FIG. 6 is a cross-sectional view of a drive device according to the first embodiment.
Figure 7:
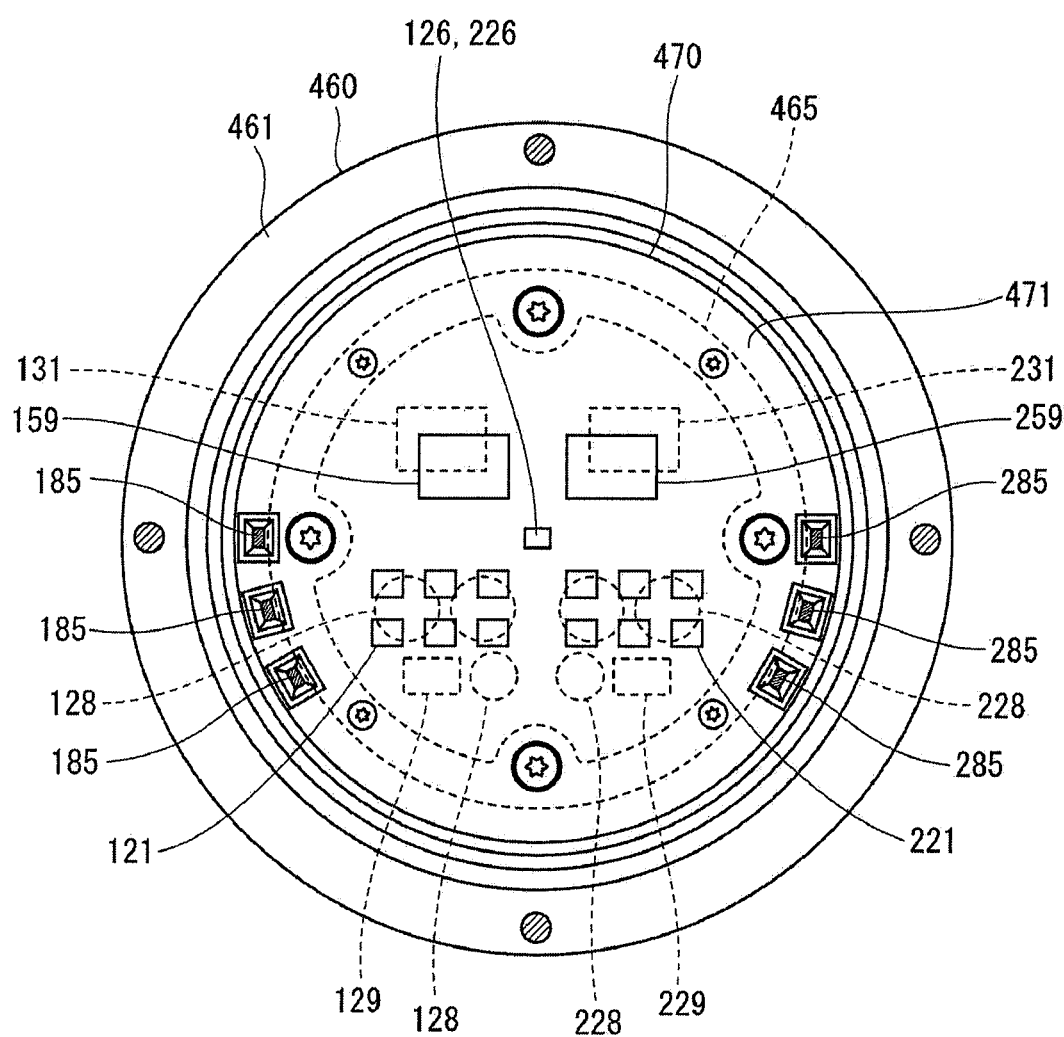
FIG. 7 is a cross-sectional view taken along a line VII-VII of FIG. 6.

The configuration of the drive device 40 will be described with reference to FIGS. 6 and 7. In the drive device 40 according to the present embodiment, an ECU 10 is integrally provided on one side in the axial direction of the motor 80, and the driving device 40 is a so-called "electro-mechanically integrated type". The ECU 10 is coaxially disposed with respect to the axis Ax of the shaft 870 on a side of the motor 80 opposite to the output shaft. The ECU 10 may be provided on the output shaft side of the motor 80. With the provision of the electro-mechanically integrated type, the ECU 10 and the motor 80 can be efficiently disposed in a vehicle having a limited mounting space.

The motor 80 includes a stator 840, a rotor 860, and a housing 830 for accommodating those components. The stator 840 is secured to the housing 830 and motor windings 180 and 280 are wound on the stator 840. The rotor 860 is provided in the radially inner side of the stator 840 and rotatable relative to the stator 840.

The shaft 870 is fitted into the rotor 860 and rotates integrally with the rotor 860. The shaft 870 is rotatably supported in the housing 830 by bearings 835 and 836. An end portion of the shaft 870 on the side of the ECU 10 projects toward the ECU 10 from the housing 830. A magnet 875 is provided at an end portion of the shaft 870 on the ECU 10 side.

The housing 830 includes a bottomed cylindrical case 834 including a rear frame end 837, and a front frame end 838 provided on an opening side of the case 834. The case 834 and the front frame end 838 are fastened to each other by a bolt or the like. Lead line insertion holes 839 are provided in the rear frame end 837. Lead lines 185 and 285 connected to the respective phases of the motor windings 180 and 280 are inserted into the lead line insertion hole 839. The lead lines 185 and 285 are taken out from the lead line insertion holes 839 to the ECU 10 side and connected to the circuit board 470.

The ECU 10 includes a cover 460, a heat sink 465 which is fixed to the cover 460, a circuit board 470 which is fixed to the heat sink 465, various electronic components which are mounted on the substrate 470, and the like.

The cover 460 protects the electronic components from an external impact, and prevents dust, water, and the like from entering an inside of the ECU 10. The cover 460 has a cover main body 461 and a connector portion 462 integrally formed with each other. The connector portion 462 may be separate from the cover main body 461. Terminals 463 of the connector portion 462 are connected to the circuit board 470 through a wire (not shown) or the like. The number of connectors and the number of terminals can be appropriately changed in accordance with the number of signals and the like. The connector portion 462 is provided on an end portion of the drive device 40 in the axial direction, and opens on a side opposite to the motor 80. The connector portion 462 includes connectors 111 to 113 and 211 to 231 which will be described later.

The substrate 470 is, for example, a printed board, and is provided to face the rear frame end 837. On the circuit board 470, electronic components of two systems are mounted independently for each system, to form a completely redundant configuration. In the present embodiment, electronic components are mounted on one circuit board 470, but the electronic components may be mounted on multiple substrates.

Of two main surfaces of the circuit board 470, one surface on the motor 80 side is defined as a motor surface 471, and the other surface on the opposite side to the motor 80 is defined as a cover surface 472. As shown in FIG. 7, a switching element 121 configuring the inverter circuit 120, a switching element 221 configuring the inverter circuit 220, rotation angle sensors 126 and 226, custom ICs 159 and 259, and the like are mounted on the motor surface 471. The rotation angle sensors 126 and 226 are mounted at places facing the magnet 875 so as to be able to detect a change in the magnetic field caused by the rotation of the magnet 875.

Capacitors 128 and 228, inductors 129 and 229, microcomputers configuring the control units 131 and 231, and the like are mounted on the cover surface 472. In FIG. 7, "131" and "231" are assigned to the microcomputers configuring the control units 131 and 231, respectively. The capacitors 128 and 228 smooth electric powers input from the batteries 191 and 291 (refer to FIG. 8). The capacitors 128 and 228 also store charge to assist in supplying the power to the motor 80. The capacitors 128, 228 and the inductors 129, 229 configure a filter circuit to reduce noise transmitted from other devices sharing the batteries 191 and 291 and to reduce noise transmitted from the drive device 40 to the other devices sharing the batteries 191 and 291. Although not shown in FIG. 7, power supply circuits 116 and 216, the motor relay, current sensors 125 and 225, and the like are also mounted on the motor surface 471 or the cover surface 472.

Figure 8:
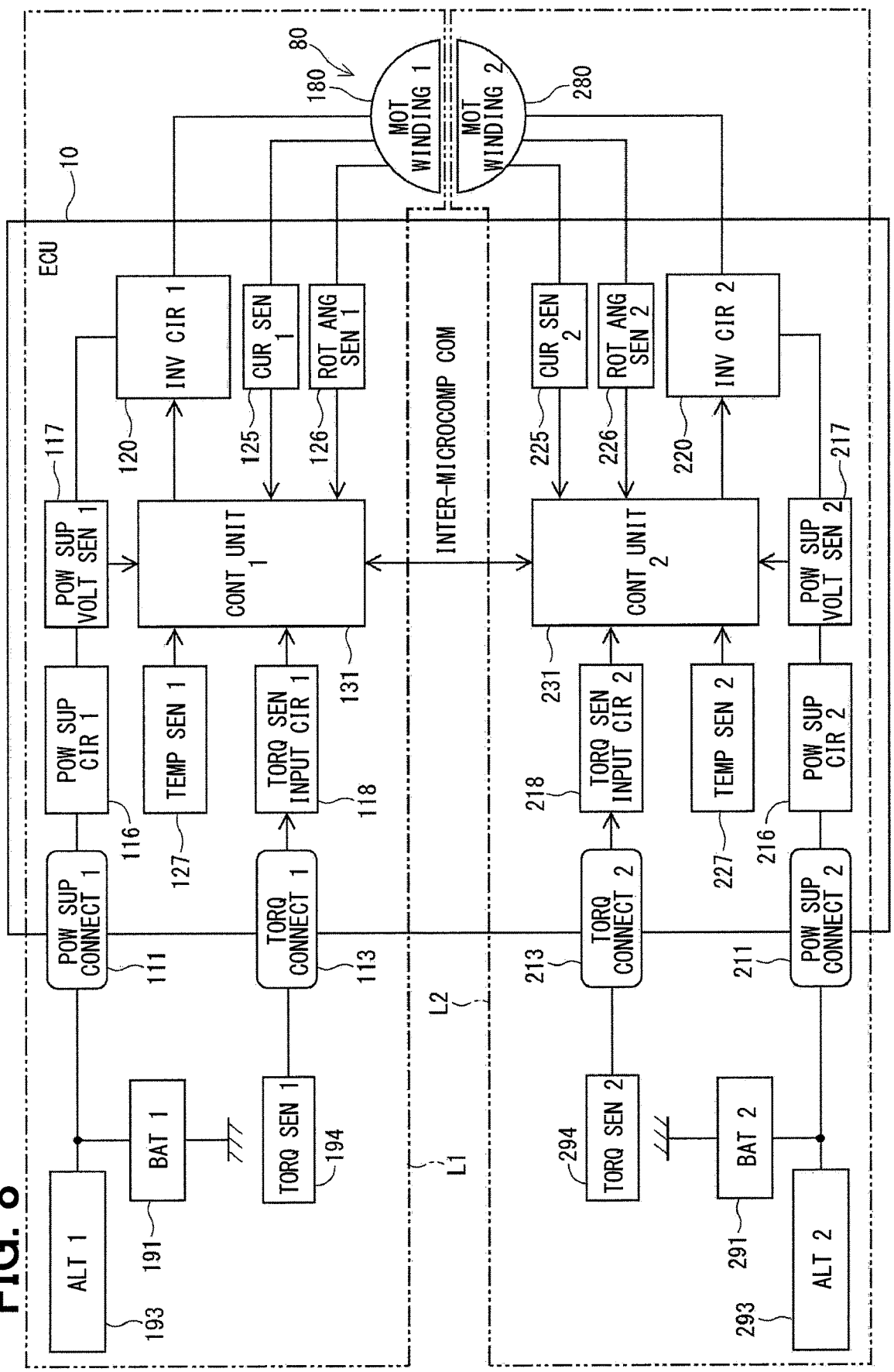
FIG. 8 is a block diagram showing a motor control device according to the first embodiment.

As shown in FIG. 8, the ECU 0 includes inverter circuits 120 and 220, and control units 131 and 231. The ECU 10 is provided with a first power supply connector 111, a first torque connector 113, a second power supply connector 211, and a second torque connector 213.

The first power supply connector 111 is connected to the first battery 191, and the second power supply connector 211 is connected to the second battery 291. A first alternator 193 is connected to the first battery 191, and a second alternator 293 is connected to the second battery 291. The first power supply connector 111 is connected to the first inverter circuit 120 through the first power supply circuit 116. The second power supply connector 211 is connected to the second inverter circuit 220 through the second power supply circuit 216. The power supply circuits 116 and 216 are, for example, power supply relays.

The torque connectors 113 and 213 are connected to the torque sensor 94. In detail, the first torque connector 113 is connected to a first sensor unit 941 of the torque sensor 94. The second torque connector 213 is connected to the torque sensor 94 and the second sensor unit 942. In FIG. 8, the first sensor unit 194 is referred to as "torque sensor 1" and the second sensor unit 294 is referred to as "torque sensor 2".

The first control unit 131 can acquire a torque signal involved in the steering torque Ts from the first sensor unit 941 of the torque sensor 94 through the torque connector 113 and a torque sensor input circuit 118. The second control unit 231 can acquire a torque signal involved in the steering torque Ts from the second sensor unit 942 of the torque sensor 94 through the torque connector 213 and the torque sensor input circuit 218. With the above configuration, the control units 131 and 231 can calculate the steering torque Ts based on the torque signal.

The first inverter circuit 120 is a three-phase inverter having the switching element 121, and converts electric power supplied to the first motor winding 180. The ON/OFF operation of the switching element 121 is controlled based on a control signal output from the first control unit 131.

The second inverter circuit 220 is a three-phase inverter having a switching element 221, and converts an electric power supplied to the second motor winding 280. The ON/OFF operation of the switching element 221 is controlled based on a control signal output from the second control unit 231.

The first current sensor 125 detects a first U-phase current Iu1, a first V-phase current Iv1, and a first W-phase current Iw1 that are supplied to the respective phases of the first motor winding 180, and outputs the detection values to the first control unit 131. The second current sensor 225 detects a second U-phase current Iu2, a second V-phase current Iv2, and a second W-phase current Iw2 that are supplied to the respective phases of the second motor winding 280, and outputs the detection values to the second control unit 231.

Hereinafter, the U-phase current, the V-phase current, and the W-phase current are collectively referred to as "phase current" or "three-phase current" as appropriate. The d-axis current and the q-axis current are collectively referred to as "dq-axis current" as appropriate. The same applies to the voltage.

The first rotation angle sensor 126 detects the rotation angle of the motor 80 and outputs the detected rotation angle to the first control unit 131. The second rotation angle sensor 226 detects the rotation angle of the motor 80 and outputs the detected rotation angle to the second control unit 231.

The first temperature sensor 127 is disposed, for example, in a region where the first inverter circuit 120 is provided, and detects a base temperature H1 of the first system L1. The second temperature sensor 227 is disposed, for example, in a region where the second inverter circuit 220 is provided, and detects a temperature B2 of the second system L2. The base temperature H1 is, for example, a heat sink temperature in an area where the first inverter circuit 120 is provided, and a base temperature H2 is, for example, a heat sink temperature in a region where the second inverter circuit 220 is provided.

The first power supply voltage sensor 117 is provided between the first power supply circuit 116 and the first inverter circuit 120, and detects a battery voltage Vb1 applied from the first battery 191. The second power supply voltage sensor 217 is provided between the second power supply circuit 216 and the second inverter circuit 220, and detects a battery voltage Vb2 applied from the second battery 291.

The first control unit 131 is supplied with a power through the first power supply connector 111, a regulator (not shown), and the like. The second control unit 231 is supplied with a power through the second power supply connector 211, a regulator (not shown), and the like. The first control unit 131 and the second control unit 231 are provided so as to be able to communicate with each other between the control units. Hereinafter, the communication between the control units 131 and 231 is referred to as "inter-microcomputer communication" as appropriate. The communication method between the control units 131 and 231 may be any method such as serial communication such as SPI or SENT, CAN (Controller Area Network) communication, FlexRay communication, or the like. The control units 131 and 231 can transmit and receive various information to and from a vehicle communication network such as CAN through a vehicle communication circuit (not shown).

The control units 131 and 231 are configured mainly by microcomputers and include a CPU, a ROM, a RAM, an I/O, and a bus line for connecting those configurations. Each processing in the control units 131 and 231 may be software processing by executing a program stored in advance in a tangible memory device such as a ROM (readable non-transitory tangible recording medium) by a CPU, or may be hardware processing by a dedicated electronic circuit.

Figure 9:
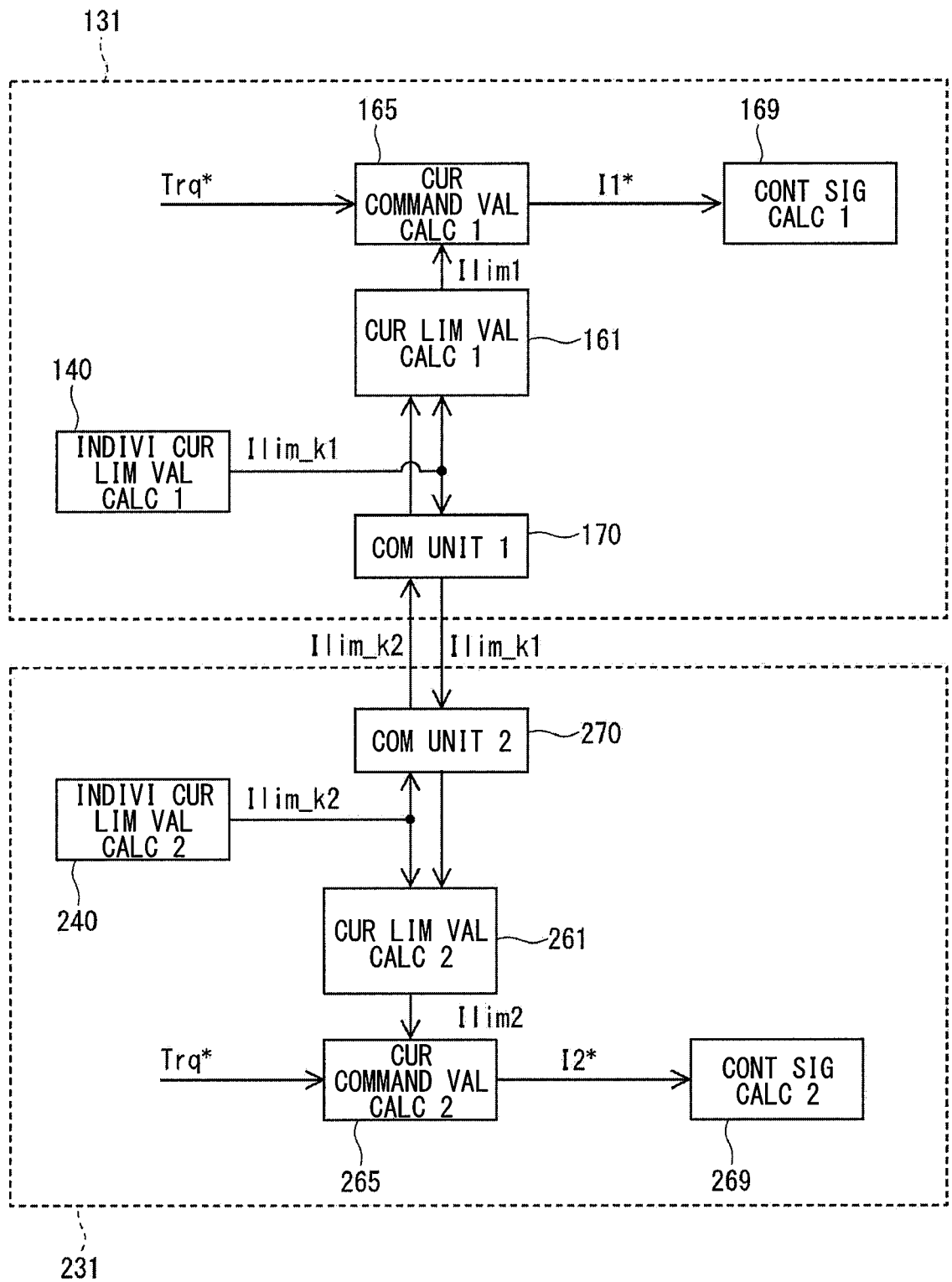
FIG. 9 is a block diagram showing a first control unit and a second control unit according to the first embodiment.

As shown in FIG. 9, the first control unit 131 includes a first individual current limit value calculation unit 140, a first current limit value calculation unit 161, a first current command value calculation unit 165, a first control signal calculation unit 169, a first communication unit 170, and the like. The second control unit 231 includes a second individual current limit value calculation unit 240, a second current limit value calculation unit 261, a second current command value calculation unit 265, a second control signal calculation unit 269, and a second communication unit 270. Each processing in the second control unit 231 is the same as that in the first control unit 131 if a value involved in the second system L2 is used instead of a value involved in the first system L1, and a value involved in the first system L1 is used instead of a value involved in the second system L2, and therefore, a description will be given below focusing on the processing in the first control unit 131, and a description of the second control unit 231 will be omitted as appropriate.

Figure 10:
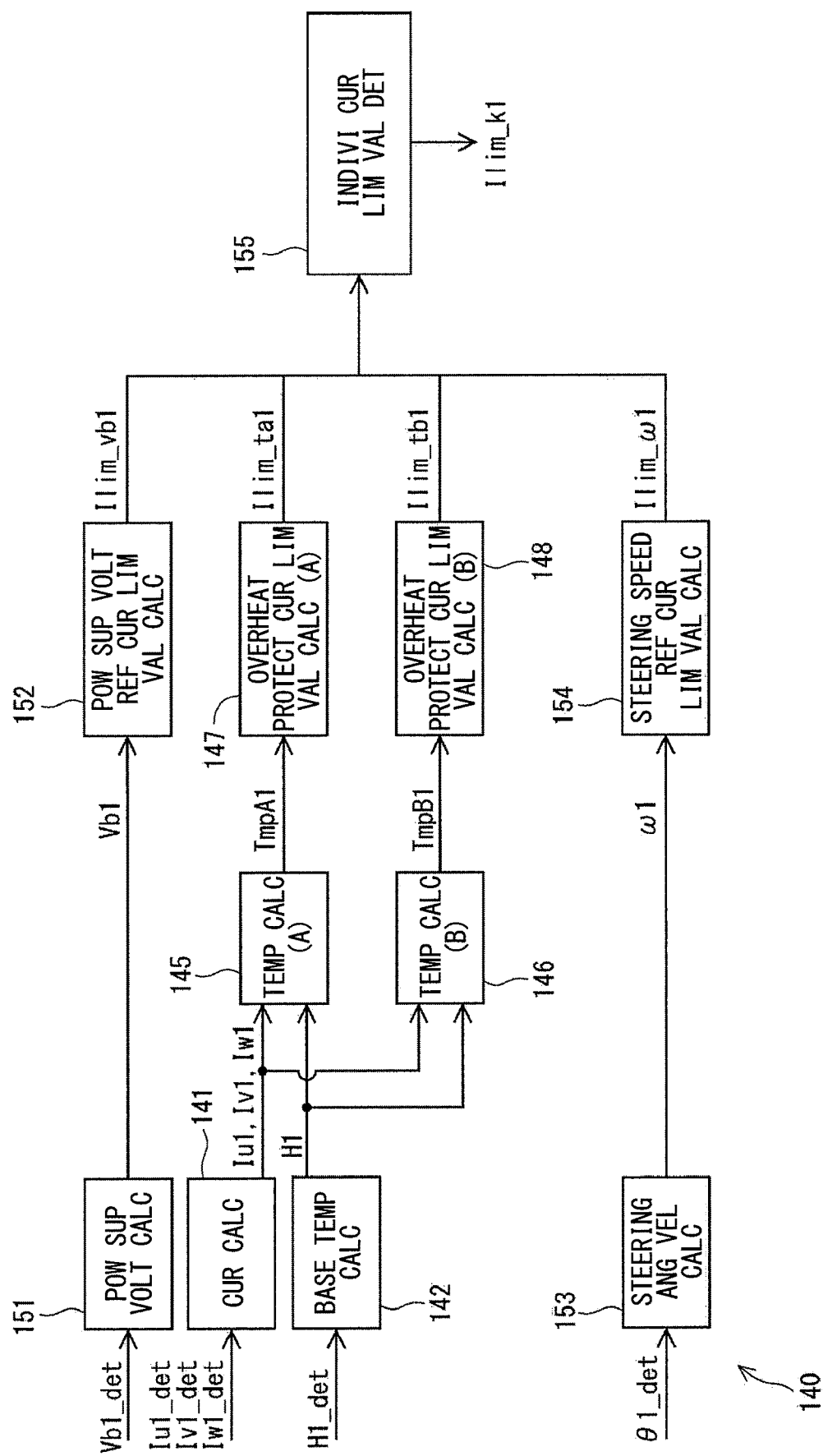
FIG. 10 is a block diagram illustrating an individual current limit value calculation unit according to the first embodiment.

The first individual current limit value calculation unit 140 calculates a first individual current limit value Ilim_k1. The details of the first individual current limit value calculation unit 140 are shown in FIG. 10. As shown in FIG. 10, the first individual current limit value calculation unit 140 includes a current calculation unit 141, a base temperature calculation unit 142, temperature calculation units 145 and 146, overheat protection current limit value calculation units 147 and 148, a power supply voltage calculation unit 151, a power supply voltage reference current limit value calculation unit 152, a steering angular velocity calculation unit 153, a steering speed reference current limit value calculation unit 154, and an individual current limit value determination unit 155.

The current calculation unit 141 calculates phase currents Iu1, Iv1, and Iw1 based on the detection values Iu1_det, Iv1_det, and Iw1_det of the current sensor 125. The base temperature calculation unit 142 calculates the base temperature H1 based on a detection value H1_det of the temperature sensor 127.

The temperature calculation unit 145 calculates a temperature TmpA1 of a portion A based on the phase currents Iu1, Iv1, and Iw1 and the base temperature H1. The temperature calculation unit 146 calculates a temperature TmpB1 of a portion B based on the phase currents Iu1, Iv1, Iw1 and the base temperature H1.

In a temperature calculation in the temperature calculation unit 145, all of the phase currents Iu1, Iv1, and Iw1 are not necessarily used, and for example, if the portion A is a U-phase switching element, the phase current Iu1 may be used. The same applies to the portion B.

The overheat protection current limit value calculation unit 147 calculates an overheat protection current limit value Ilim_ta1 based on the temperature TmpA1. The overheat protection current limit value Ilim_ta1 is set to a predetermined value when the temperature TmpA1 is lower than a temperature threshold Tmp_th. When the temperature TmpA1 is equal to or more than the temperature threshold Tmp_th, the overheat protection current limit value Ilim_ta is set to a smaller value as the temperature rises.

The overheat protection current limit value calculation unit 148 calculates an overheat protection current limit value Ilim_tb1 based on the temperature TmpB1. The overheat protection current limit value Ilim_tb1 is calculated in the same manner as the overheat protection current limit value Ilim_ta1. Note that the temperature threshold Tmp_th, a rate of current decrease attributable to a temperature rise, and the like may be the same or different for each of the calculation units 146 and 147.

In this example, an example has been described in which the overheat protection current limit values Ilim_ta and Ilim_tb are calculated based on two temperatures of arbitrary portions A and B, but the overheat protection current limit value may be calculated based on a temperature of one portion, or the overheat protection current limit value may be calculated based on temperatures of three or more portions.

The power supply voltage calculation unit 151 calculates the battery voltage Vb1 based on a detection value Vb1_det of the power supply voltage sensor 117. The power supply voltage reference current limit value calculation unit 152 calculates the power supply voltage reference current limit value Ilim_Vb1 based on the battery voltage Vb1. The power supply voltage reference current limit value Ilim_Vb1 is set to be smaller as the battery voltage Vb1 becomes smaller. When the battery voltage Vb1 is larger than the voltage threshold, the battery voltage Vb1 may be set to a predetermined value.

The steering angular velocity calculation unit 153 calculates a steering angular velocity ω1 based on a detection value θ1_det of the rotation angle sensor 126, a gear ratio of the reduction gear 89, and the like. The steering speed reference current limit value calculation unit 154 calculates a steering speed reference current limit value Ilim_ω1 based on the steering angular velocity ω1. The steering speed reference current limit value Ilim_ω1 is calculated in accordance with the steering angular velocity ω1.

The individual current limit value determination unit 155 determines the individual current limit value Ilim_k1 based on the calculated current limit values Ilim_ta1, Ilim_tb1, Ilim_Vb1, and Ilim_ω1. In the present embodiment, the smallest one of the current limit values Ilim_ta1, Ilim_tb1, Ilim_Vb1, and Ilim_ω1 is the first individual current limit value Ilim_k1 involved in the first system L1. The calculated first individual current limit value Ilim_k1 is transmitted from the communication unit 170 to the second control unit 231.

Similarly, the second individual current limit value calculation unit 240 calculates a second individual current limit value Ilim_k2. The calculated second individual current limit value Ilim_k2 is transmitted from the communication unit 270 to the first control unit 131. That is, the individual current limit values Ilim_k1 and Ilim_k2 are mutually transmitted and received by the control units 131 and 231, and are commonly available.

As shown in FIG. 9, the current limit value calculation unit 161 acquires the individual current limit value Ilim_k1 of the host system from the individual current limit value calculation unit 140. In addition, the current limit value calculation unit 161 acquires the individual current limit value Ilim_k2 of the other system by the inter-microcomputer communication. The current limit value calculation unit 161 calculates a current limit value Ilim1 based on the individual current limit values Ilim_k1 and Ilim_k2. The details of the current limit value calculation processing will be described later.

The first current command value calculation unit 165 calculates a first current command value I1*. When a pre-limit current command value I1*_a corresponding to a torque command value Trq* is equal to or less than the current limit value Ilim1, the current command value calculation unit 165 directly sets the pre-limit current command value I1*_a as the current command value I1* as it is. When the pre-limit current command value I1*_a is larger than the current limit value Ilim1, the current limit value Ilim1 is set to the current command value I1*. The torque command value Trq* may share a value calculated by one of the control units 131 and 231, or may be calculated by each of the control units 131 and 231. The first control signal calculation unit 169 generates a control signal based on the first current command value I1* and outputs the control signal to the first inverter circuit 120.

The second current command value calculation unit 265 calculates a second current command value I2*. When a pre-limit current command value I2*_a corresponding to the torque command value Trq* is equal to or less than a current limit value Il2m1, the current command value calculation unit 265 sets the pre-limit current command value I2*_a as a current command value I2* as it is, and sets a current limit value Ilim2 as the current command value I2* when the pre-limit current command value I2*_a is larger than the current limit value Ilim2. The second control signal calculation unit 269 generates a control signal based on the second current command value I2*, and outputs the control signal to the second inverter circuit 220.

Figure 11:
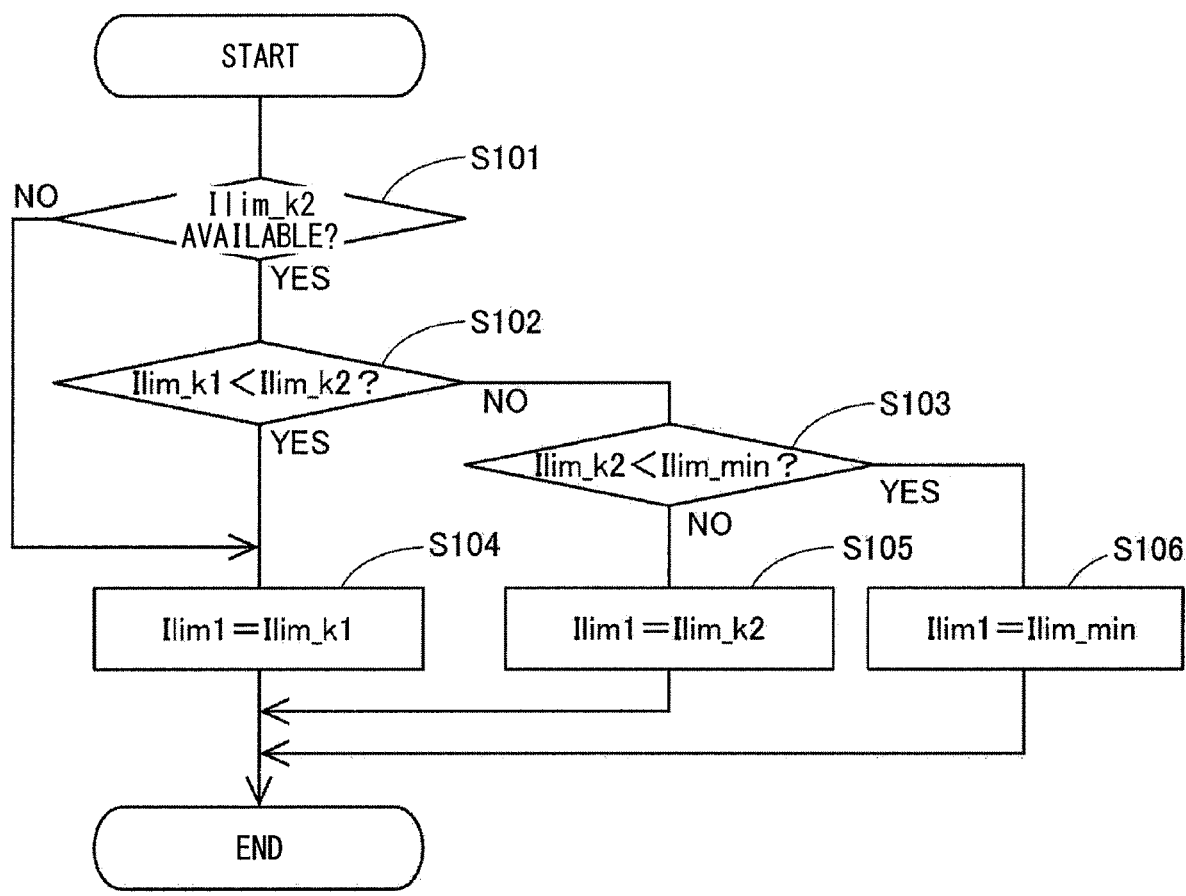
FIG. 11 is a flowchart illustrating a current limit value calculation processing in a first current limit value calculation unit according to the first embodiment.

The current limit value calculation processing in the first current limit value calculation unit 161 will be described with reference to a flowchart shown in FIG. 11. Hereinafter, the "step" in step S101 will be omitted, and the symbol "S" will be simply referred to. The other steps are the same.

In the first S101, the first current limit value calculation unit 161 determines whether or not the second individual current limit value Ilim_k2 is available. For example, when it is determined that the second individual current limit value Ilim_k2 cannot be acquired due to a communication abnormality or the like (NO in S101), the process proceeds to S104. When it is determined that a second individual current limit value Ilim_k2 is available (YES in S101), the process proceeds to S102.

In S102, the first current limit value calculation unit 161 determines whether or not the first individual current limit value Ilim_k1 is smaller than the second individual current limit value Ilim_k2. When it is determined that the first individual current limit value Ilim_k1 is smaller than the second individual current limit value Ilim_k2 (YES in S102), the process proceeds to S104. When it is determined that the first individual current limit value Ilim_k1 is equal to or larger than the second individual current limit value Ilim_k2 (NO in S102), the process proceeds to S103.

In S103, the first current limit value calculation unit 161 determines whether or not the second individual current limit value Ilim_k2 is smaller than a limit lower limit value Ilim_min. When it is determined that the second individual current limit value Ilim_k2 is equal to or larger than the limit lower limit value Ilim_min (NO in S103), the process proceeds to S105. When it is determined that the second individual current limit value Ilim_k2 is smaller than the limit lower limit value Ilim_min (YES in S103), the process proceeds to S106.

In S104 in which the second individual current limit value Ilim_k2 is not available (NO in S101), or when the first individual current limit value Ilim_k1 is smaller than the second individual current limit value Ilim_k2 (YES in S102), the first current limit value calculation unit 161 sets the first current limit value Ilim1 as the first individual current limit value Ilim_k1.

In S105 to which the process shifts when the second individual current limit value Ilim_k2 is equal to or less than the first individual current limit value Ilim_k1 and equal to or greater than the limit lower limit value Ilim_min (NO in S102, and NO in S103), the first current limit value calculation unit 161 sets the first current limit value Ilim1 as the second individual current limit value Ilim_k2.

In S106 to which the process shifts when the second individual current limit value Ilim_k2 is equal to or smaller than the first individual current limit value Ilim_k1 and is smaller than the limit lower limit value Ilim_min (NO in S102 and YES in S103), the first current limit value calculation unit 161 sets the first current limit value Ilim1 as the limit lower limit value Ilim_min.

Figure 12:
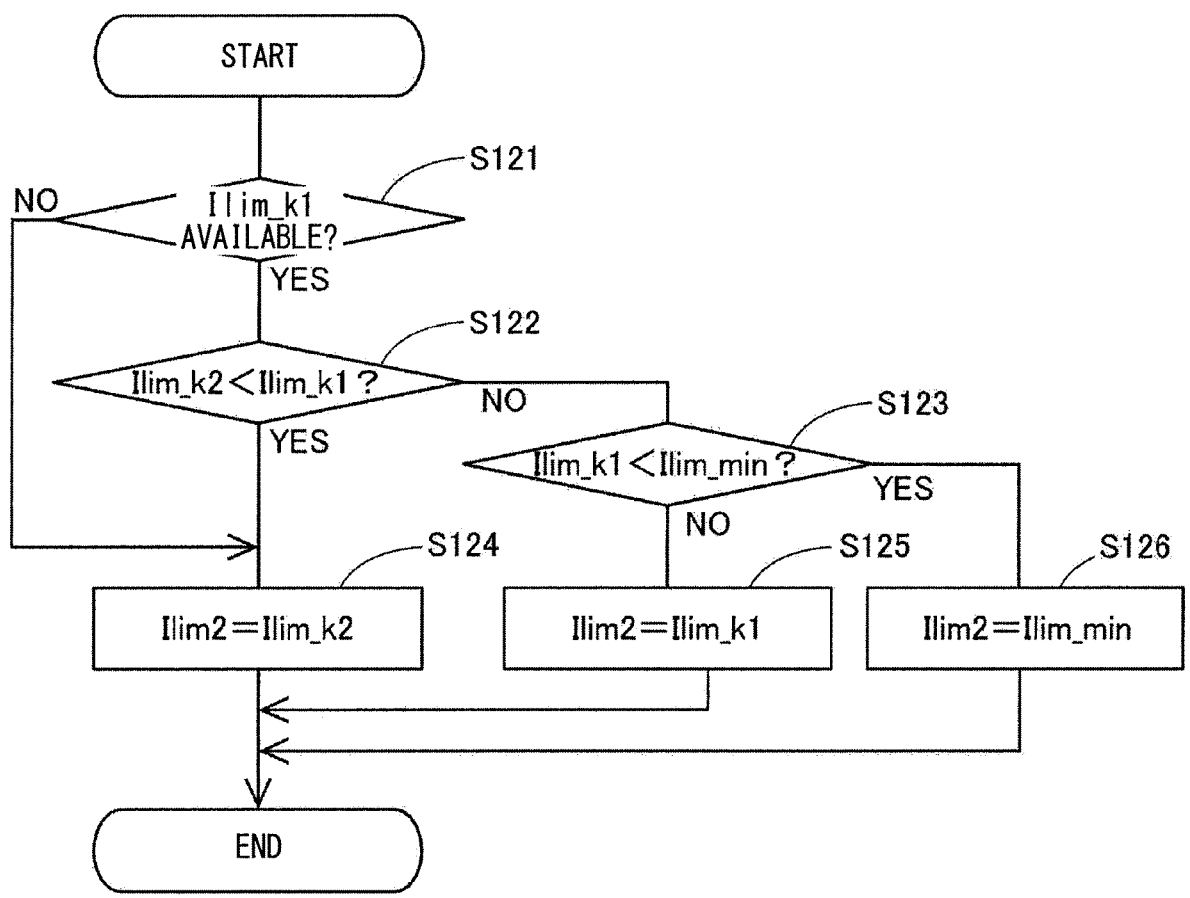
FIG. 12 is a flowchart illustrating a current limit value calculation processing in a second current limit value calculation unit according to the first embodiment.

FIG. 12 shows a current limit value calculation processing in the second current limit value calculation unit 261. In the process of the second current limit value calculation unit 261, the first individual current limit value Ilim_k1 in the flowchart of FIG. 11 may be read as the second individual current limit value Ilim_k2, the second individual current limit value Ilim_k2 may be read as the first individual current omit value Ilim_k1, and the first current limit value Ilim1 may be read as the second current limit value Ilim2, and therefore a detailed description of the above processing will be omitted.

When the first individual current limit value Ilim_k1 is not available (NO in S121), or when the second individual current limit value Ilim_k2 is smaller than the first individual current limit value Ilim_k1 (YES in S122), the second current limit value calculation unit 261 sets the second current limit value Ilim2 to the second individual current limit value Ilim_k2 (S124).

When the first individual current limit value Ilim_k1 is equal to or less than the second individual current limit value Ilim_k2 and equal to or more than the limit lower limit value Ilim_min (NO in S122 and NO in S123), the second current limit value Ilim2 is set to the first individual current limit value Ilim_k1 (S125).

When the first individual current limit value Ilim_k1 is equal to or less than the second individual current limit value Ilim_k2 and is smaller than the limit lower limit value Ilim_min (NO in S122 and YES in S123), the second current limit value Ilim2 is set to the limit lower limit value Ilim_min (S126).

Figure 13:
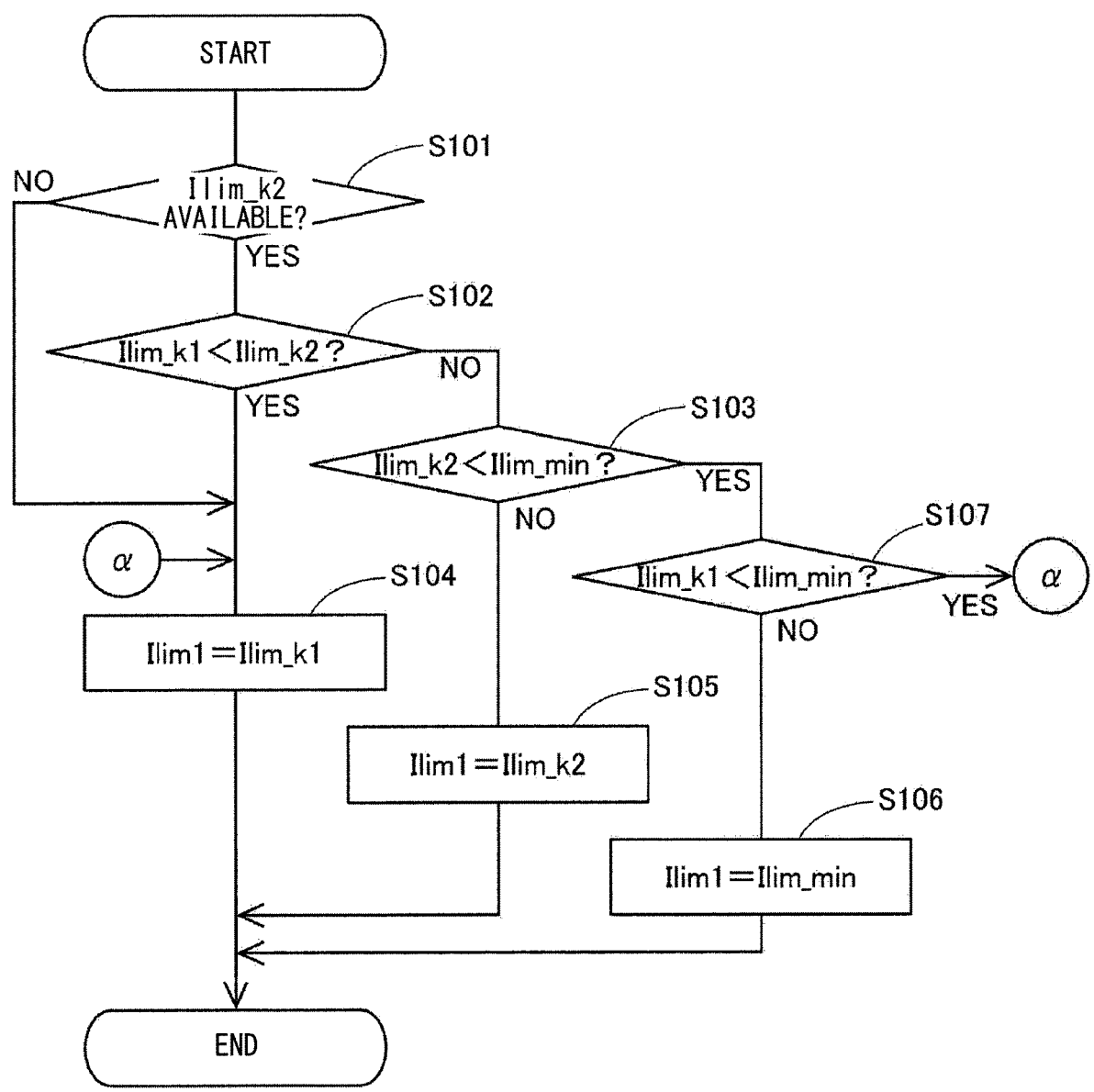
FIG. 13 is a flowchart illustrating a current limit value calculation processing in the first current limit value calculation unit according to the first embodiment.

A modification of the current limit value calculation processing will be described with reference to flowcharts of FIGS. 13 and 14. FIG. 13 is a process performed by the first current limit value calculation unit 161, and a step S107 is added to the flowchart of FIG. 11, and the process processes to S107 in the case where an affirmative determination is made in S103.

In S107, the first current limit value calculation unit 161 determines whether or not the first individual current limit value Ilim_k1 is smaller than the limit lower limit value Ilim_min. When it is determined that the first individual current limit value Ilim_k1 is smaller than the limit lower limit value Ilim_min (YES in S107), the process proceeds to S104, and the first current limit value Ilim1 is set as the first individual current limit value Ilim_k1. When it is determined that the first individual current limit value Ilim_k1 is equal to or larger than the limit lower limit value Ilim_min (NO in S107), the process proceeds to S106, and the first current limit value Ilim1 is set as the limit lower limit value Ilim_min.

Figure 14:
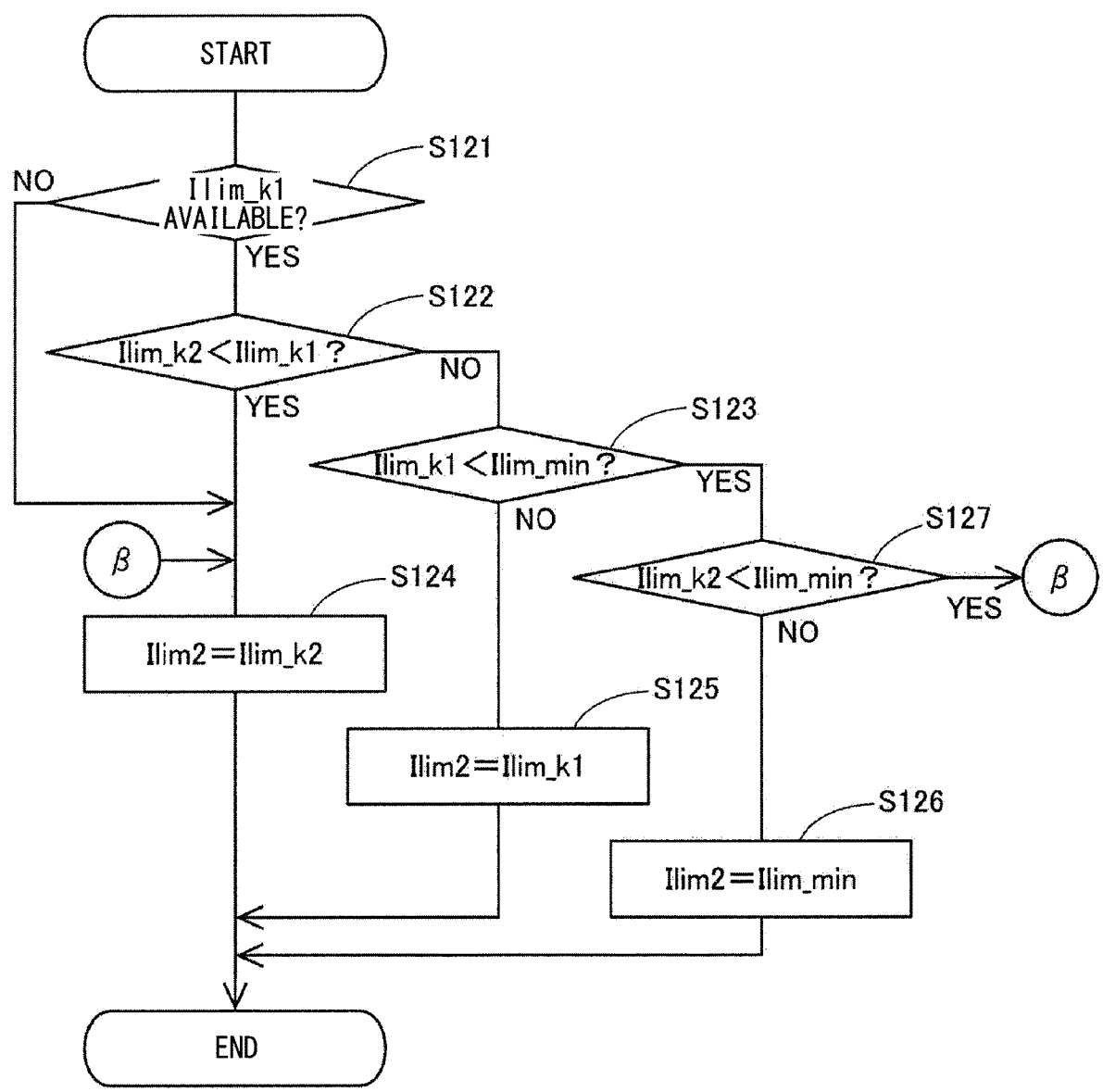
FIG. 14 is a flowchart illustrating the current limit value calculation processing in the second current limit value calculation unit according to the first embodiment.

FIG. 14 is a process in the second current limit value calculation unit 261, in which S127 is added to the flowchart of FIG. 12, and the process proceeds to S127 when an affirmative determination is made in S123. In S127, the second current limit value calculation unit 261 determines whether or not the second individual current limit value Ilim_k2 is smaller than the limit lower limit value Ilim_min. When it is determined that the second individual current limit value Ilim_k2 is smaller than the limit lower limit value Ilim_min (YES in S127), the process proceeds to S124, and the second individual current limit value Ilim2 is set as the second individual current limit value Ilim_k2. When it is determined that the second individual current limit value Ilim_k2 is equal to or larger than the limit lower limit value Ilim_min (NO in S127), the process proceeds to S126, and the second current limit value Ilim2 is set as the limit lower limit value Ilim_min. As a result, the current limit values Ilim1 and Ilim2 can be set more appropriately.

Figure 15:
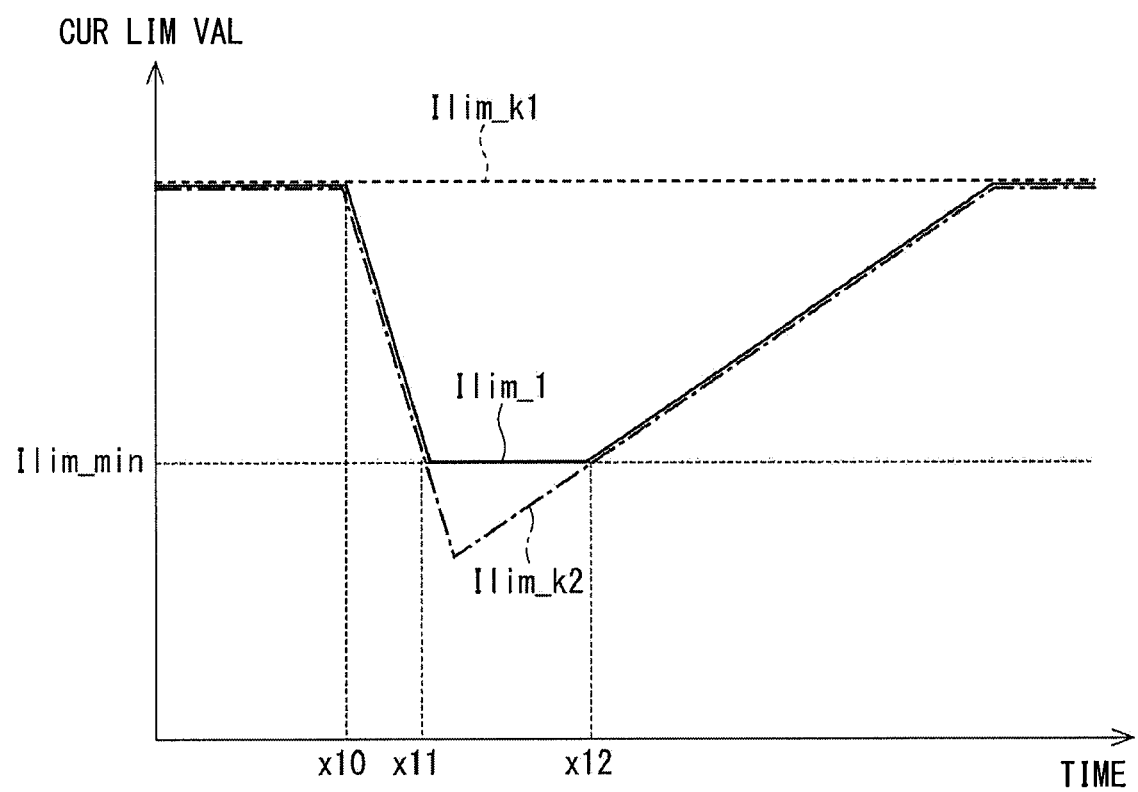
FIG. 15 is a time chart illustrating the current limit value calculation processing according to the first embodiment.

The current limit value calculation processing will be described with reference to the time chart of FIG. 15. In FIG. 15, for the sake of description, the second current limit value Ilim2 is omitted, and the respective values are slightly shifted from each other. The same applies to time charts in embodiments which will be described later.

As shown in FIG. 15, since the individual current limit values Ilim_k1 and Ilim_k2 coincide with each other until a time x10, the first current limit value Ilim1 coincides with the individual current limit values Ilim_k1 and Ilim_k2. Since the second individual current limit value Ilim_k2 is smaller than the first individual current limit value Ilim_k1 and larger than the limit lower limit value Ilim_min between times x10 and x11, the first current limit value Ilim1 is set to the second individual current limit value Ilim_k2 by minimum selection.

Since the second individual current limit value Ilim_k2 is equal to or less than the limit lower limit value Ilim_min between the time x11 and a time x12, an assist continuation is prioritized and the first current limit value Ilim1 is set to the limit lower limit value Ilim_min. Since the individual current limit values Ilim_k1 and Ilim_k2 are larger than the limit lower limit value Ilim_min after the time x12, the first current limit value Ilim1 is set by minimum selection. In the example of FIG. 15, a current limit value sharing mode is performed before the time x11 and after the time x12, and a current limit value non-sharing mode is performed between the time x11 and the time x12.

In the present embodiment, the individual current limit value calculation units 140 and 240 calculate the overheat protection current limit value for overheat protection, the current limit value of a voltage reference, and the current limit value of a steering speed reference, respectively, and calculate the individual current limit values Ilim_k1 and Ilim_k2 by minimum selection.

Incidentally, for example, when the power supply voltage of one of the systems is lowered, the voltage reference current limit value may differ depending on an applicable potential difference for each system. Further, when the temperature differs depending on the system, the overheat protection reference current limit value may differ from system to system. In such a case, the individual current limit values Ilim_k1 and Ilim_k2 have different values. When the current limit value is different for each system, when the current limit is applied, a difference occurs in the current command value of each system. If the current command value differs from system to system, the output becomes uneven, and vibration and noise may become large. In particular, when quietness is improved by shifting the current phase between the systems, there is a fear of deterioration of vibration and noise.

Therefore, in the present embodiment, the individual current limit values Ilim_k1 and Ilim_k2 are mutually transmitted and received by the control units 131 and 231, and if the individual current limit values Ilim_k1 and Ilim_k2 are equal to or larger than the limit lower limit value Ilim_min, the smaller one of the individual current limit values Ilim_k1 and Ilim_k2 is set to the current limit values Ilim1 and Ilim2, and the current limit values Ilim1 and Ilim2 of both the systems are set to the same value. Hereinafter, setting the current limit values Ilim1 and Ilim2 to the same value as appropriate is referred to as "sharing the current limit value". This makes it possible to equalize the current command values of both the systems even when the current limit is applied.

Further, for example, when one of the individual current limit values Ilim_k1 and Ilim_k2 is 0, if the current limit value is set by the minimum selection of both the systems as described above, the outputs of both the systems become 0, resulting in an assist stop state in which the steering cannot be assisted. Similarly, when the individual current limit values Ilim_k1 and Ilim_k2 are relatively small values close to 0, if the current limit value is set by the minimum select, sufficient assist may not be performable.

Therefore, in the present embodiment, when the individual current limit value of one system is smaller than the limit lower limit value Ilim_min, the assist continuation is prioritized over the deterioration of noise and vibration, and the current limit value of the other system is set to the limit lower limit value Ilim_min as the minimum selection with limit. This makes it possible to avoid a subordinate failure and to continue the steering assist. The limit lower limit value Ilim_min can be set to an arbitrary value to the extent that the steering assist can be continued, but is set to, for example, ½ of a rated current.

As described above, the ECU 10 according to the present embodiment controls driving of the motor 80 including the multiple motor windings 180 and 280, and includes the multiple inverter circuits 120 and 220 and the multiple control units 131 and 231. The control units 131 and 231 output the control signals corresponding to the current command values I1* and I2* to the respective inverter circuits 120 and 220.

At least one of the control units 131 and 231 calculates the current limit values Ilim1 and Ilim2 for limiting the current command values I1* and I2* based on the individual current limit values Ilim_k1 and Ilim_k2 calculated based on parameters involved in the respective systems L1 and L2. The individual current limit values Ilim_k1 and Ilim_k2 are current limit values calculated for each system, and in the present embodiment, the temperatures TmpA1 and TmpB1, the battery voltage Vb1, and the steering angular velocity ω1 correspond to "parameters involved in each system (in this example, the first system L1)". Similarly, in the second system L2, the temperature, the battery voltage, and the steering angular velocity correspond to the "parameters".

The control units 131 and 231 include individual current limit value calculation units 140 and 240, current limit value calculation units 161 and 262, and control signal calculation units 169 and 269, respectively. In this example, a unit of the components including the motor windings 180 and 280 and the inverter circuits 120 and 220 is defined as a system. The individual current limit value calculation units 140 and 240 calculate the individual current limit values Ilim_k1 and Ilim_k2, which are values for each system involved in the current limitation. The current limit value calculation units 161 and 261 set the current limit values Ilim1 and Ilim2 based on the individual current limit values Ilim_k1 and Ilim_k2. The control signal calculation units 169 and 269 calculate control signals based on current command values calculated according to the current limit values Ilim1 and Ilim2, and output the calculated control signals to the inverter circuits 120 and 220. The current limit value calculation units 161 and 261 can switch between the current limit value sharing mode in which the current limit values Ilim1 and Ilim2 are matched with each other between the host system and other system, and the current limit value non-sharing mode in which the current limit values Ilim1 and Ilim2 are individually set between the host system and other system.

In the present embodiment, the current limit values Ilim1 and Ilim2 are calculated based on the individual current limit values Ilim_k1 and Ilim_k2 involved in the respective systems. The current limit values Ilim1 and Ilim2 are shared based on the individual current limit values Ilim_k1 and Ilim_k2 of the respective systems, thereby being capable of reducing the variations in the current command values I1* and I2* due to variations in the current limit values Ilim1 and Ilim2. With a reduction in the variations in the current command values I1* and I2*, the vibration and noise can be reduced. Further, with switching between the current limit value sharing mode and the current limit value non-sharing mode, it is possible to appropriately drive and control the motor 80 in accordance with the state of the system or the like.

All of the control units 131 and 231 include the current limit value calculation units 161 and 261. The control units 131 and 231 transmit and receive the individual current limit values Ilim_k1 and Ilim_k2 calculated by the respective control units 131 and 231 by communication. As a result, the current limit values Ilim1 and Ilim2 can be appropriately calculated by the respective current limit value calculation units 161 and 261.

In the current limit value sharing mode, the current limit value calculation units 161 and 261 set the smallest value of the individual current limit values Ilim_k1 and Ilim_k2 of the respective systems as the current limit values Ilim1 and Ilim2. With the calculation of the current limit values Ilim1 and Ilim2 by minimum selection of the individual current limit values Ilim_k1 and Ilim_k2, the current limit values Ilim1 and Ilim2 of all the systems L1 and L2 can be shared.

The current limit value calculation units 161 and 261 are set to the current limit value sharing mode when the individual current limit values Ilim_k1 and Ilim_k2 of all the systems are equal to or greater than the limit lower limit value Ilim_min, and are set to the current limit value non-sharing mode when the individual current limit values Ilim_k1 and Ilim_k2 of at least one system are less than the limit lower limit value Ilim_min.

In the current limit value non-sharing mode, the current limit value calculation units 161 and 261 set the current limit values Ilim1 and Ilim2 of the system in which the individual current limit values Ilim_k1 and Ilim_k2 are equal to or higher than the limit lower limit value Ilim_min as the limit lower limit value Ilim_min. The current limit value calculation units 161 and 261 set a current limit value of a system in which the individual current limit value is less than the limit lower limit value Ilim_min as an individual current limit value of the system. This makes it possible to secure a minimum output regardless of the individual current limit value of the other system.

The ECU 10 according to the present embodiment is applied to the electric power steering device 8. The electric power steering device 8 includes the ECU 10, the motor 80, and the reduction gear 89. The motor 80 outputs an assist torque for assisting the driver to steer the steering wheel 91. The reduction gear 89 transmits a driving force of the motor 80 to the steering shaft 92. In the present embodiment, since the variations in the current limit values Ilim1 and Ilim2 are reduced, the vibration and noise of the electric power steering device can be reduced.

Second Embodiment

Figure 16:
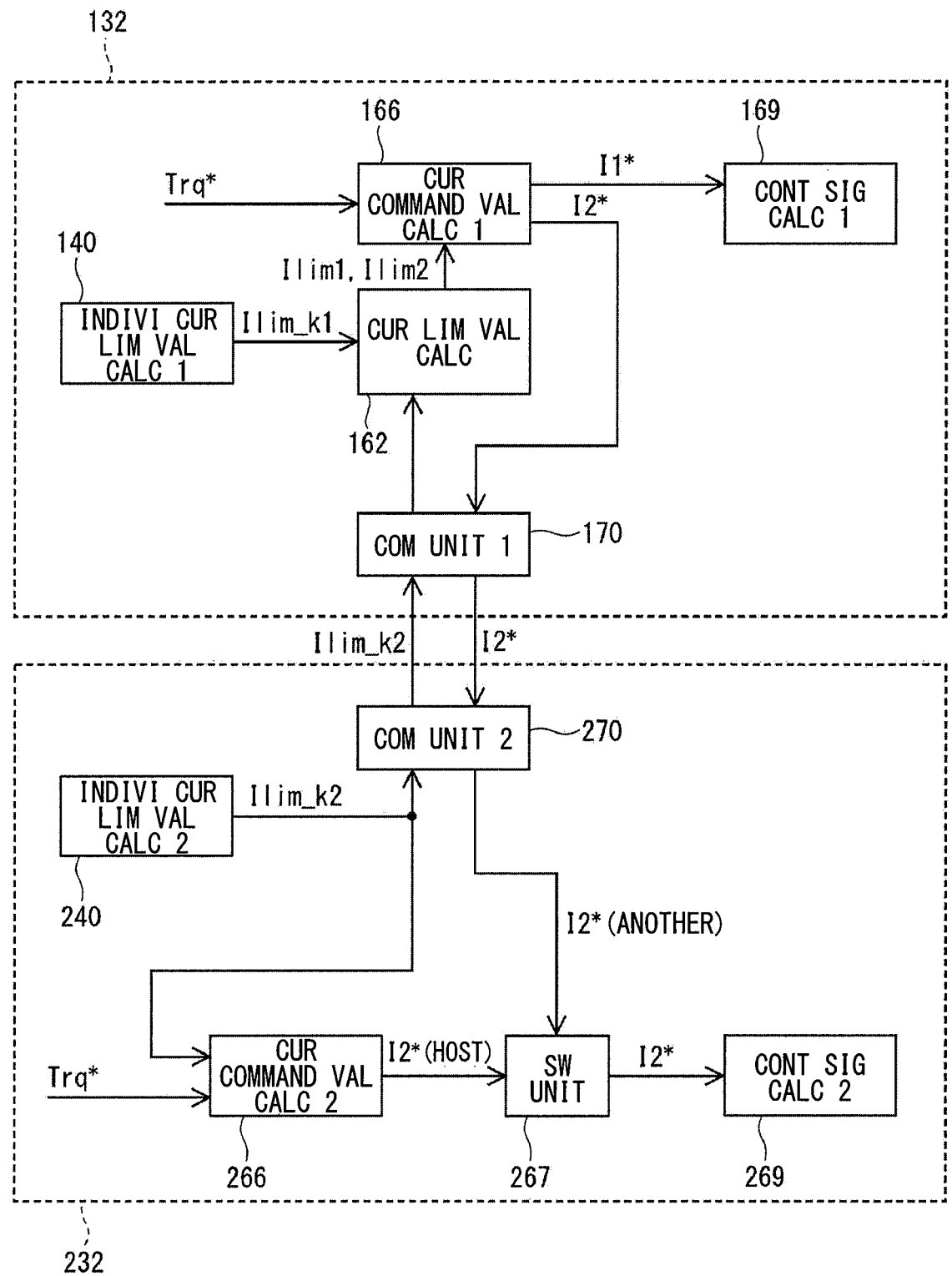
FIG. 16 is a block diagram showing a first control unit and a second control unit according to a second embodiment.
Figure 17:
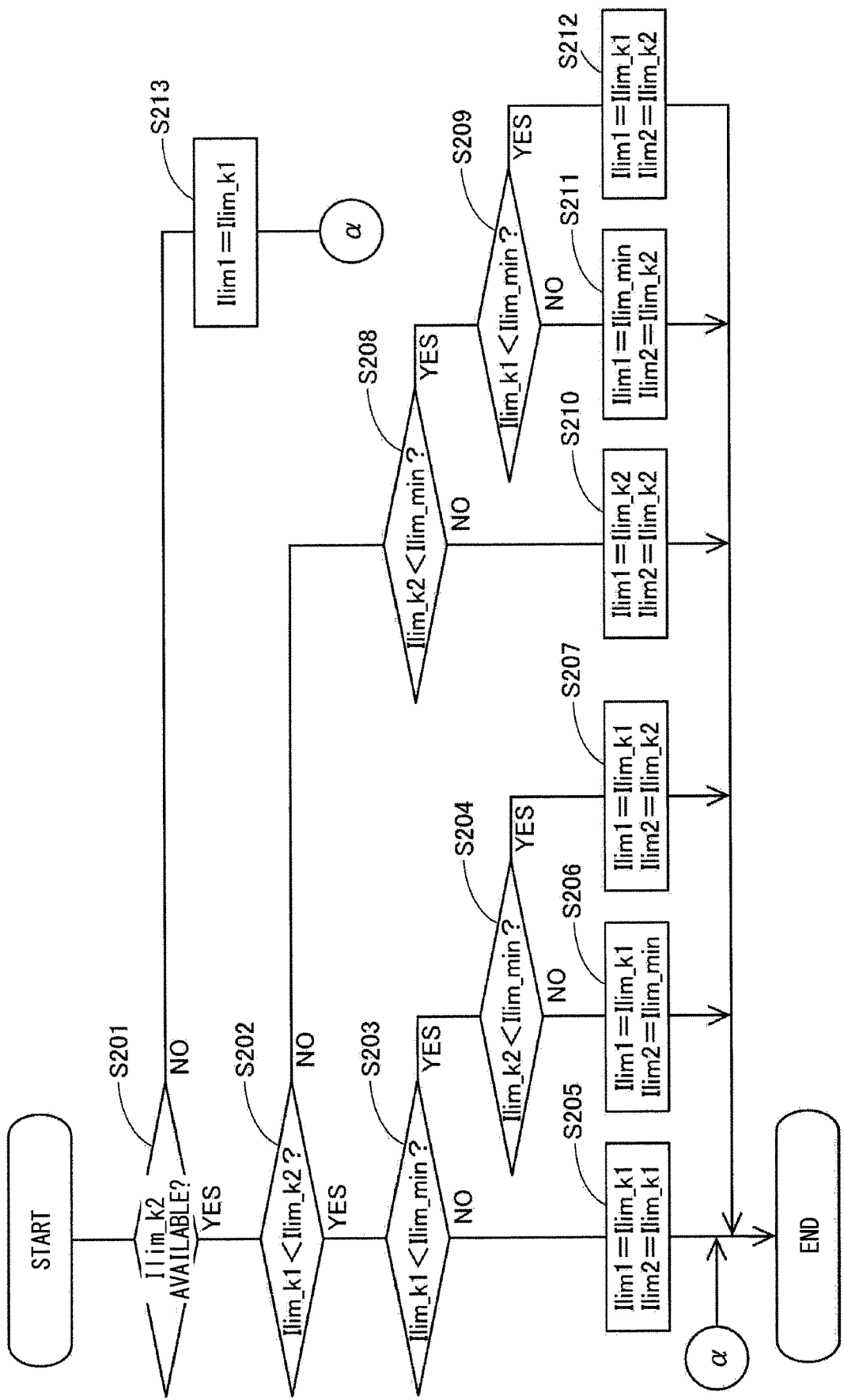
FIG. 17 is a flowchart illustrating a current limit value calculation processing according to the second embodiment.

A second embodiment will be described with reference to FIGS. 16 and 17. Since the present embodiment differs from the above embodiment in the calculation of the current limit value and the current command value, the present embodiment will be described focusing on the different calculation. As shown in FIG. 16, a first control unit 132 includes a first individual current limit value calculation unit 140, a first current limit value calculation unit 162, a first current command value calculation unit 166, a first control signal calculation unit 169, a first communication unit 170, and the like. A second control unit 232 includes a second individual current limit value calculation unit 240, a second current command value calculation unit 266, a switching unit 267, a second control signal calculation unit 269, and a second communication unit 270.

In the second control unit 232 according to the present embodiment, the second current limit value calculation unit 261 of the embodiment described above is omitted, and the current limit values Ilim1 and Ilim2 are both calculated by the current limit value calculation unit 162 of the first control unit 132.

A current limit value calculation processing in the current limit value calculation unit 162 will be described with reference to a flowchart shown in FIG. 17. A process in S201 is the same as that in S101 in FIG. 5, and when a second individual current limit value Ilim_k2 is available (YES in S201), the process proceeds to S202, and when the second individual current limit value Ilim_k2 is not available (NO in S201), the process proceeds to S213.

A process in S202 is the same as that of S102, and when a first individual current limit value Ilim_k1 is smaller than the second individual current limit value Ilim_k2 (YES in S202), the process proceeds to S203, and when the first individual current limit value Ilim_k1 is equal to or larger than the second individual current limit value (NO in S202), the process proceeds to S208.

In S203, the current limit value calculation unit 162 determines whether or not the first individual current limit value Ilim_k1 is smaller than a limit lower limit value Ilim_min. When it is determined that the first individual current limit value Ilim_k1 is equal to or larger than the limit lower limit value Ilim_min (NO in S203), the process proceeds to S205. When it is determined that the first individual current limit value Ilim_k1 is smaller than the limit lower limit value Ilim_min (YES in S203), the process proceeds to S204.

In S204, the current limit value calculation unit 162 determines whether or not the second individual current limit value Ilim_k2 is smaller than the limit lower limit value Ilim_min. When it is determined that the second individual current limit value Ilim_k2 is equal to or larger than the limit lower limit value Ilim_min (NO in S204), the process proceeds to S206. When it is determined that the second individual current limit value Ilim_k2 is smaller than the limit lower limit value Ilim_min (YES in S204), the process proceeds to S207.

In S205 to which the process proceeds when the first individual current limit value Ilim_k1 is smaller than the second individual current limit value Ilim_k2 and the first individual current limit value Ilim_k1 is equal to or larger than the limit lower limit value Ilim_min (YES in S202, NO in S203), the current limit value calculation unit 162 sets both of a first current limit value Ilim1 and a second current limit value Ilim2 as the first individual current limit value Ilim_k1.

IN S206 to which the process proceeds when the first individual current limit value Ilim_k1 is smaller than the second individual current limit value Ilim_k2, the first individual current limit value Ilim_k1 is smaller than the limit lower limit value Ilim_min, and the second individual current limit value Ilim_k2 is equal to or larger than the limit lower limit value Ilim_min (YES in S202, YES in S203, NO in S204), the current limit value calculation unit 162 sets the first current limit value Ilim1 to the first individual current limit value Ilim_k1, and sets the second current limit value Ilim2 to the limit lower limit value Ilim_min.

In S207 to which the process proceeds when the first individual current limit value Ilim_k1 is smaller than the second individual current limit value Ilim_k2 and both the first individual current limit value Ilim_k1 and the second individual current limit value Ilim_k2 are smaller than the limit lower limit value Ilim_min (YES in S202, YES in S203, YES in S204), the current limit value calculation unit 162 sets the first current limit value Ilim1 to the first individual current limit value Ilim_k1 and sets the second current limit value Ilim2 to the second individual current limit value Ilim_k2.

In S208 to which the process proceeds when the first individual current limit value Ilim_k1 is equal to or larger than the second individual current limit value Ilim_k2 (NO in S202), the current limit value calculation unit 162 determines whether or not the second individual current limit value Ilim_k2 is smaller than the limit lower limit value Ilim_min. When it is determined that the second individual current limit value Ilim_k2 is equal to or larger than the limit lower limit value Ilim_min (NO in S208), the process proceeds to S210. When it is determined that the second individual current limit value Ilim_k2 is smaller than the limit lower limit value Ilim_min (YES in S208), the process proceeds to S209.

In S209, the current limit value calculation unit 162 determines whether or not the first individual current limit value Ilim_k1 is smaller than the limit lower limit value Ilim_min. When it is determined that the first individual current limit value Ilim_k1 is equal to or larger than the limit lower limit value Ilim_min (NO in S209), the process proceeds to S211. When it is determined that the first individual current limit value Ilim_k1 is smaller than the limit lower limit value Ilim_min (YES in S209), the process proceeds to S212.

In S210 to which the process proceeds when the first individual current limit value Ilim_k1 is equal to or more than the second individual current limit value Ilim_k2 and the second individual current limit value Ilim_k2 is equal to or more than the limit lower limit value Ilim_min (NO in S202, NO in S208), the current limit value calculation unit 162 sets both the first current limit value Ilim1 and the second current limit value Ilim2 as the second individual current limit value Ilim_k2.

In S211 to which the process proceeds when the first individual current limit value Ilim_k1 is equal to or more than the second individual current limit value Ilim_k2, the second individual current limit value Ilim_k2 is smaller than the limit lower limit value Ilim_min, and the first individual current limit value Ilim_k1 is equal to or more than the limit lower limit value Ilim_min (NO in S202, YES in S208, NO in S209), the current limit value calculation unit 162 sets the first current limit value Ilim1 as the limit lower limit value Ilim_min, and sets the second current limit value Ilim2 as the second individual current limit value Ilim_k2.

In S212 to which the process proceeds when the first individual current limit value Ilim_k1 is equal to or more than the second individual current limit value Ilim_k2 and both of the first individual current limit value Ilim_k1 and the second individual current limit value Ilim_k2 are smaller than the limit lower limit value Ilim_min (NO in S202, YES in S208, YES in S209), the current limit value calculation unit 162 sets the first current limit value Ilim1 to the first individual current limit value Ilim_k1 and sets the second current limit value Ilim2 to the second individual current limit value Ilim_k2.

In S213 to which the process proceeds when the second individual current limit value Ilim_k2 is unavailable (NO in S201), the current limit value calculation unit 162 sets the first current limit value Ilim1 as the first individual current limit value Ilim_k1. In addition, the current limit value calculation unit 162 cannot calculate the second current limit value Ilim2. The current limit value calculation units 161 and 261 according to the first embodiment may perform the same calculation as in FIG. 17, and the first control unit 131 may use the first current limit value Ilim1 and the second control unit 231 may use the second current limit value Ilim2.

Returning to FIG. 16, the first current command value calculation unit 166 calculates the current command values I1* and I2* based on the current limit values Ilim1 and Ilim2. The detailed calculation of the current command values I1* and I2* is the same as in the above embodiment. The calculated first current command value I1* is used for generating a control signal in the first control signal calculation unit 169. The second current command value I2* is transmitted to the second control unit 232 by inter-microcomputer communication. When the second current limit value Ilim2 cannot be calculated, information indicating that the second current command value I2* cannot be calculated is transmitted to the second control unit 232.

A process in the second current command value calculation unit 266 of the second control unit 232 is the same as the process in the second current command value calculation unit 265 according to the first embodiment except that the second individual current limit value Ilim_k2 is used instead of the second current limit value Ilim2. In FIG. 16, the second current command value calculated by the second control unit 232 is referred to as "I2* (host)", and the second current command value calculated by the inter-microcomputer communication calculated in the first control unit 132 is referred to as "I2* (other)".

The switching unit 267 switches the current command value used for the control signal calculation. Specifically, when the command value is transmitted from the first control unit 132 in the inter-microcomputer communication, the value transmitted from the first control unit 132 is output to the control signal calculation unit 269 as the second current command value I2*. When the command value is not transmitted from the first control unit 132 due to a communication abnormality or the like, or when information indicating that the second current command value I2* cannot be calculated by the first control unit 132 is transmitted, a value calculated by the second current command value calculation unit 266 is output to the control signal calculation unit 269 as the second current command value I2*.

In the present embodiment, the first control unit 132 calculates the current limit value and the current command value. The second control unit 232 generates the control signal based on the current command value calculated by the first control unit 132. In other words, in the present embodiment, the first control unit 132 functions as a "master control unit" and the second control unit 232 functions as a "slave control unit". As a result, since the control units 132 and 232 can be coordinated with each other, it is possible to eliminate the complexity of the arbitration for the mismatch of the command values between the systems. When the command value cannot be acquired from the first control unit 132 due to a communication anomaly or the like, the second control unit 232 calculates the second current command value I2*. As a result, even when a communication abnormality occurs, the driving of the second system L2 side can be appropriately continued.

In the present embodiment, the current limit value calculation unit 162 is provided in one control unit 132, and calculates the current limit values Ilim1 and Ilim2 for all the systems L1 and L2. As a result, the calculation of the current limit value in the second control unit 232 can be omitted. In addition, the same effects as those of the above embodiment can be obtained.

Third Embodiment

Figure 18:
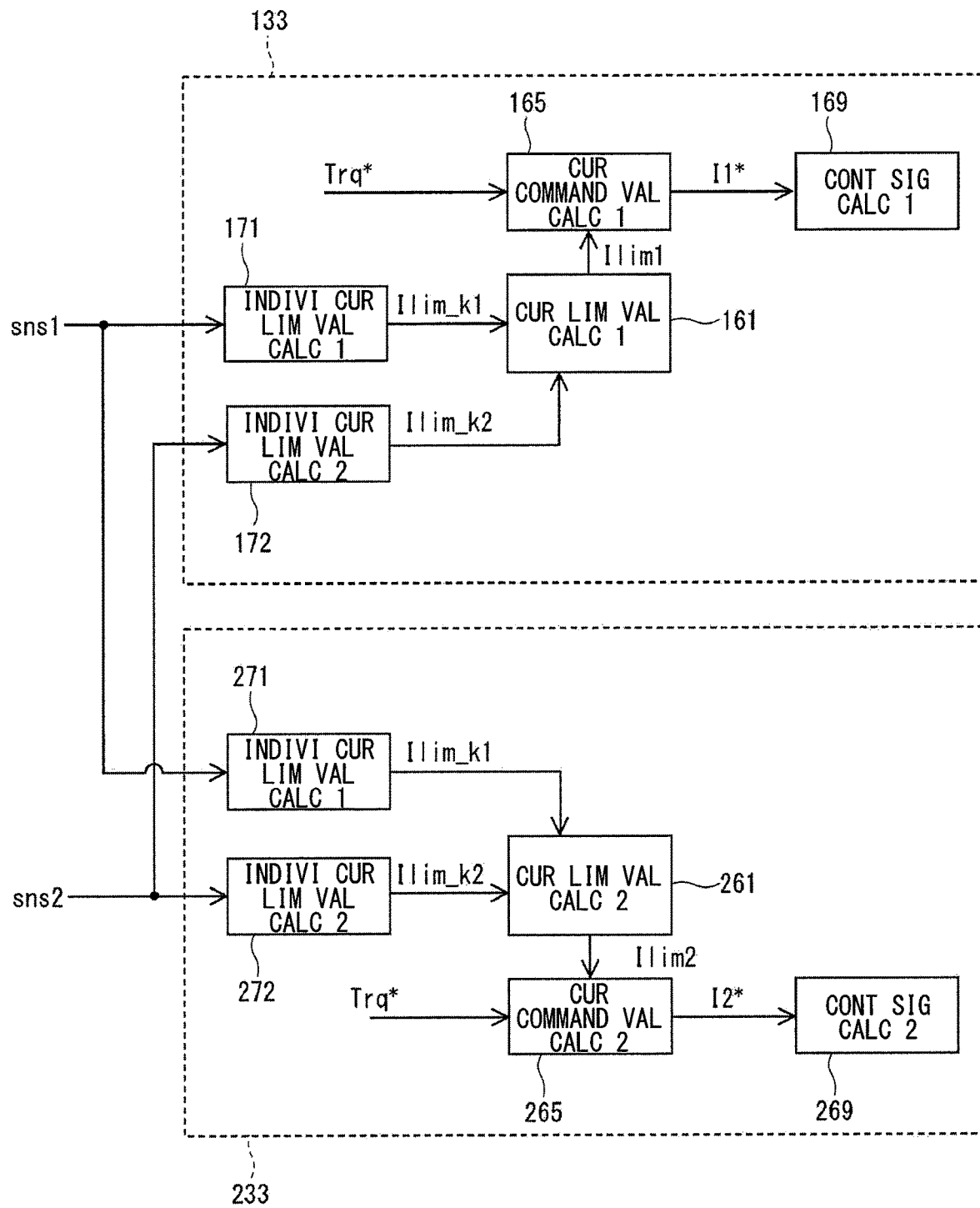
FIG. 18 is a block diagram showing a first control unit and a second control unit according to a third embodiment.

A third embodiment is shown in FIG. 18. As shown in FIG. 8, a first control unit 133 includes individual current limit value calculation units 171 and 172, a first current limit value calculation unit 161, a first current command value calculation unit 165, a first control signal calculation unit 169, and the like. A second control unit 233 includes individual current limit value calculation units 271 and 272, a second current limit value calculation unit 261, a second current command value calculation unit 265, a second control signal calculation unit 269, and the like.

The individual current limit value calculation unit 171 of the first control unit 133 and the individual current limit value calculation unit 271 of the second control unit 233 are the same as the first individual current limit value calculation unit 140, and receive a detection value sns1 involved in a first system L1 to calculate a first individual current limit value Ilim_k1. The individual current limit value calculation unit 172 of the first control unit 133 and the individual current limit value calculation unit 272 of the second control unit 233 are the same as the second individual current limit value calculation unit 240, and receive a detection value sns2 involved in a second system L2 to calculate a second individual current limit value Ilim_k2.

In this example, the detection values of a current, a voltage, a temperature, a rotation angle, and the like involved in the first system L1 are collectively referred to as "sns1", and the detection values of the current, the voltage, the temperature, the rotation angle, and the like involved in the second system L2 are collectively referred to as "sns2".

In the present embodiment, the detection values of the respective systems are cross-input to the control units 133 and 233, and the first individual current limit value Ilim_k1 and the second individual current limit value Ilim_k2 are calculated by the control units 133 and 233, respectively. In the present embodiment, the transmission and reception of the individual current limit values Ilim_k1 and Ilim_k2 by the inter-microcomputer communication are not performed. The calculations in the current limit value calculation units 161 and 261, the current command value calculation units 165 and 265, and the control signal calculation units 169 and 269 are the same as those in the first embodiment.

In the present embodiment, parameters used for calculation of the individual current limit values Ilim_k1 and Ilim_k2 involved in the respective systems L1 and L2 are input to all the control units 133 and 233, and the individual current limit values Ilim_k1 and Ilim_k2 involved in the host system and the other system are calculated by the respective control units 133 and 233. In the present embodiment, the detection values sns1 and sns2 correspond to "parameters".

The parameters involved in the calculation of the individual current limit values Ilim_k1 and Ilim_k2 are input to the respective control units 133 and 263, thereby being capable of appropriately calculating the current limit values Ilim1 and Ilim2 without performing an inter-microcomputer communication. In addition, the same effects as those of the above embodiment can be obtained.

Fourth Embodiment

Figure 19:
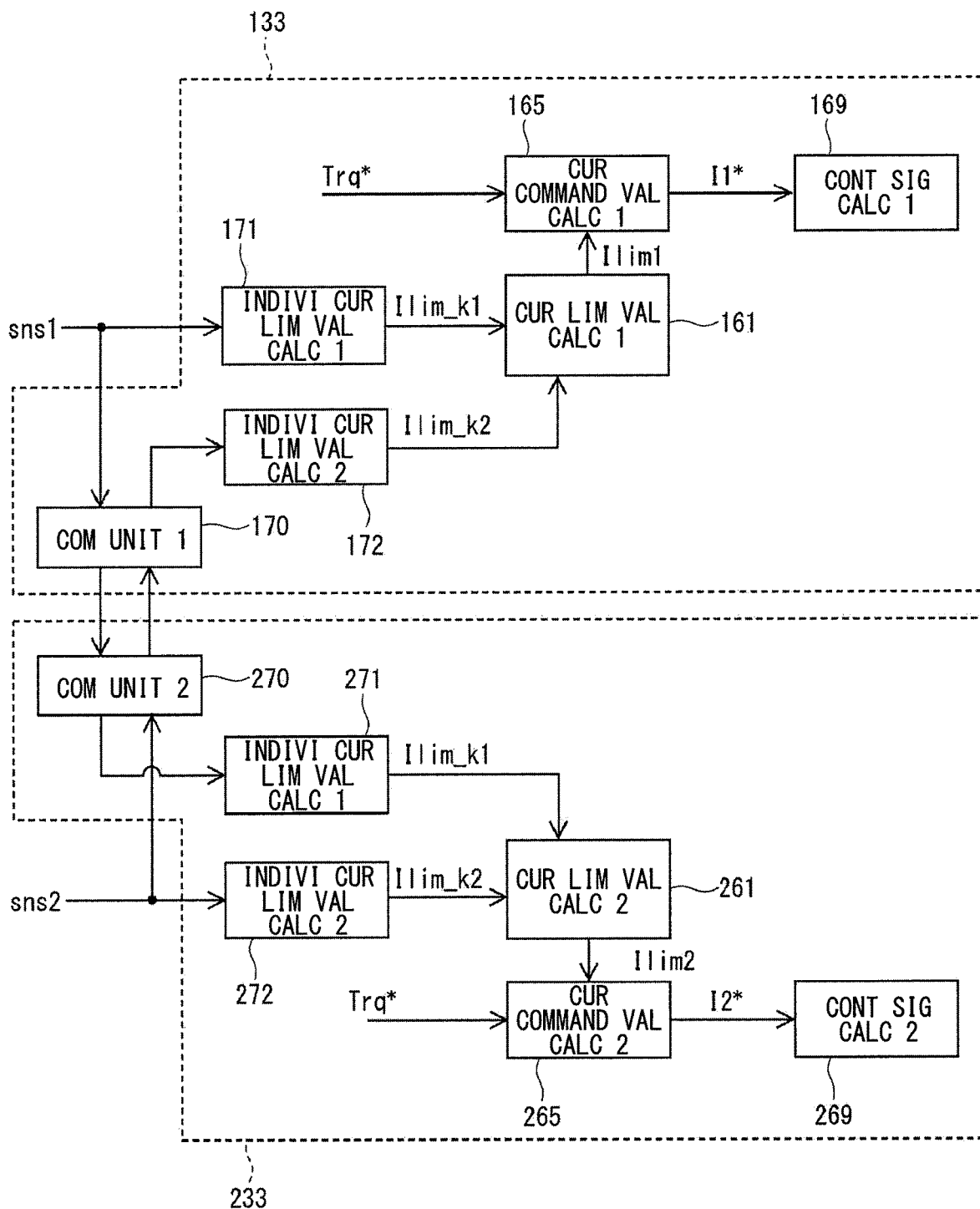
FIG. 19 is a block diagram showing a first control unit and a second control unit according to a fourth embodiment.

A fourth embodiment is shown in FIG. 19. The fourth embodiment is a modification of the third embodiment. An individual current limit value calculation unit 172 calculates a second individual current limit value Ilim_k2 with the use of a detection value sns2 acquired in an inter-microcomputer communication. An individual current limit value calculation unit 271 calculates a first individual current limit value Ilim_k1 with the use of a detection value sns1 acquired in the inter-microcomputer communication. This configuration also achieves the same effects as those of the above embodiment.

In the current limit value calculation unit 162 according to the second embodiment, as in the third embodiment and the fourth embodiment, instead of acquiring the individual current limit value Ilim_k2 from the second control unit 232, the detection value sns2 involved in the second system L2 may be inputted, and the first control unit 132 may calculate the individual current limit value Ilim_k2 based on the detection value sns2.

Fifth Embodiment

FIGS. 20 to 26 show a fifth embodiment. In the embodiments described above, the current limit values Ilim1 and Ilim2 are shared by the minimum selection. When the individual current limit value of one system is smaller than the limit lower limit value Ilim_min, the assist continuation is prioritized, and the current limit value of the other system is set to the limit lower limit value Ilim_min as the minimum selection with limit. The limited minimum selection shares the current limit values Ilim1 and Ilim2 when the individual current limit values Ilim_k1 and Ilim_k2 of both systems are equal to or higher than the limit lower limit value Ilim_min, and the limited minimum selection does not share the current limit values Ilim1 and Ilim2 when the individual current limit value of one system is smaller than the limit lower limit value Ilim_min. In other words, a sharing mode in which the current limit values Ilim1 and Ilim2 are shared and a non-sharing mode in which the current limit values Ilim1 and Ilim2 are not shared are switched in accordance with the individual current limit values Ilim_k1 and Ilim_k2.

Figure 20:
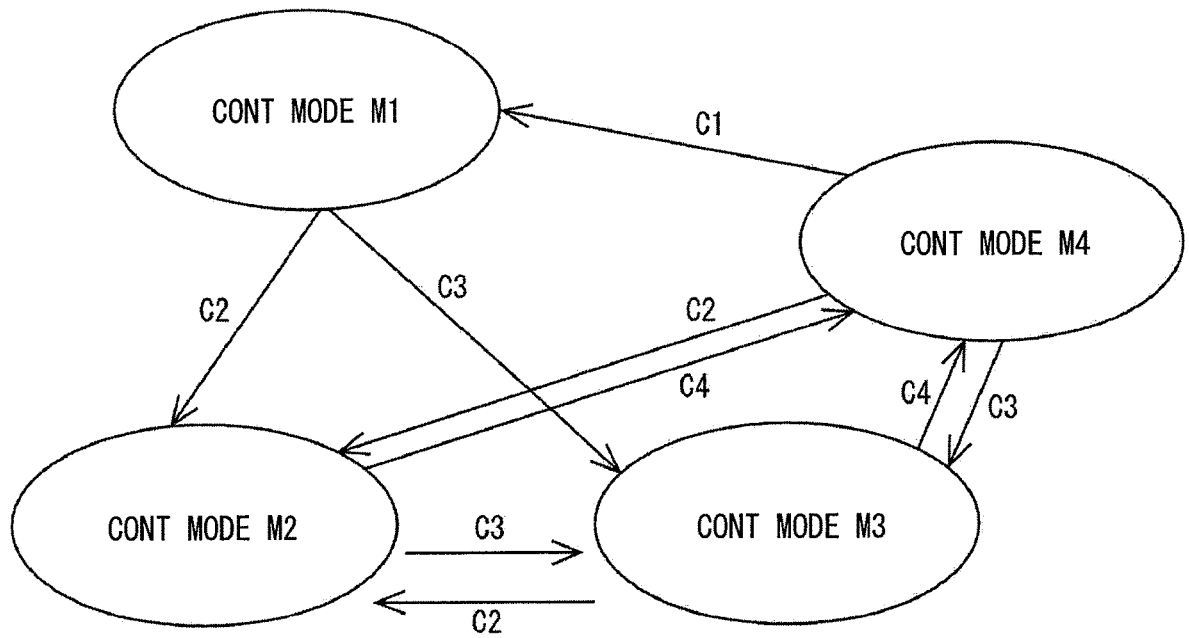
FIG. 20 is a transition diagram illustrating a mode transition according to a fifth embodiment.

In the present embodiment, as shown in FIG. 20, four control modes corresponding to individual current limit values Ilim_k1 and Ilim_k2 are transitioned, thereby switching between sharing and non-sharing of current limit values.

In a control mode M1, the individual current limit values Ilim_k1 and Ilim_k2 are both equal to or larger than a limit lower limit value Ilim_min. That is, Ilim_k1≥Ilim_min and Ilim_k2≥Ilim_min are met. In the control mode M1, the current limit values Ilim1 and Ilim2 are shared.

In a control mode M2, one of the individual current limit values and Ilim_k2 is equal to or more than the limit lower limit value Ilim_min, and the other is less than the limit lower limit value Ilim_min. That is, Ilim_k1 Ilim_min and Ilim_k2<Ilim_min, or Ilim_k1 and Ilim_k2≥Ilim_min are met. In the control mode M2, the current limit values Ilim1 and Ilim2 are not shared.

In a control mode M3, the individual current limit values Ilim_k1 and Ilim_k2 are both less than the limit lower limit value Ilim_min. That is, and Ilim_k2<Ilim_min are set. In the control mode 3, the current limit values Ilim1 and Ilim2 are not shared.

In a control mode M4, as in the control mode M1, both the individual current limit values Ilim_k1 and Ilim_k2 are equal to or larger than the limit lower limit value Ilim_min. That is, Ilim_k1≥Ilim_min and Ilim_k2≥Ilim_min are met. The control mode M4 is a mode through which the processing passes when returning from the control modes M2 and M3 to the control mode M1, and does not share the current limit values Ilim1 and Ilim2.

A mode transition will be described. A transition condition C2 is that one of the individual current limit values and Ilim_k2 is greater than or equal to the limit lower limit value Ilim_min and the other is less than the limit lower limit value and when the transition condition C2 is satisfied in the control modes M1, M3, and M4, the transition is made to the control mode M2.

A transition condition C3 is that both the individual current limit values Ilim_k1 and Ilim_k2 are less than the limit lower limit value Ilim_min, and when the transition condition C3 is satisfied in the control modes M1, M2, and M4, the transition is made to the control mode M3.

A transition condition C4 is that both the individual current limit values Ilim_k1 and Ilim_k2 become equal to or higher than the limit lower limit value Ilim_min, and when the transition condition C4 is satisfied in the control modes M2 and M3, the transition to the control mode M4 is performed. The transition condition C1 is that a mode M1 transition permission flag, which will be described later, is set, and when the transition condition C1 is satisfied in the control mode M4, the transition to the control mode M1 is performed.

The limit lower limit values Ilim_min in the transition conditions C2 and C3 and the limit lower limit value Ilim_min in the transition condition C4 may be the same value or different values. For example, the limit lower limit value Ilim_min in the transition condition C4 may be larger than the limit lower limit value Ilim_min the transition conditions C2 and C3. With the provision of hystereses to the thresholds involved in the transition condition of the control mode, variations in the current limit values Ilim1 and Ilim2 can be reduced. In order to reduce the variations in the current limit values Ilim1 and Ilim2, a mode transition prohibition period may be provided after the mode transition.

Figure 21:
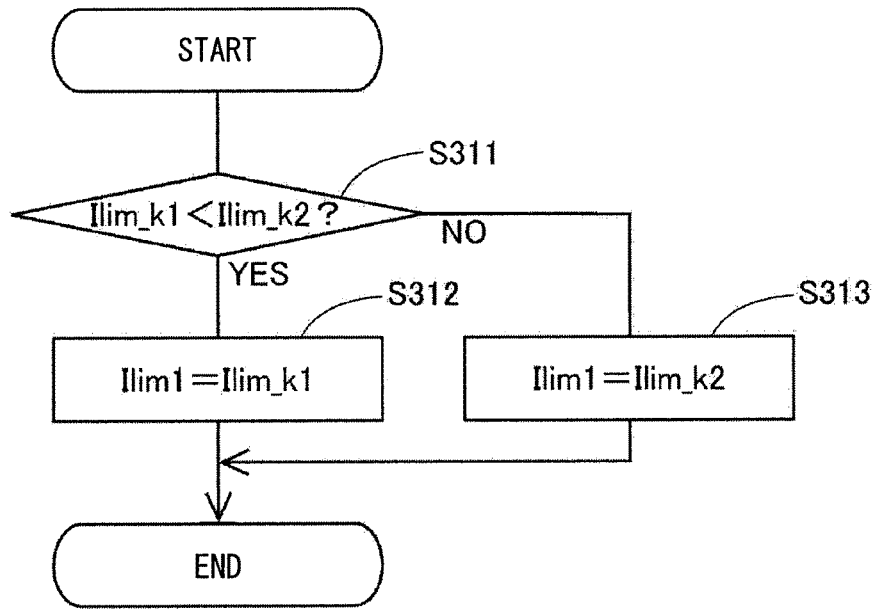
FIG. 21 is a flowchart illustrating a current limit value calculation processing according to the fifth embodiment.

A current limit value calculation processing in each control mode is shown in FIGS. 21 to 24. FIG. 21 is a flowchart illustrating a current limit value calculation processing in the control mode M1. The above processing is executed by the current limit value calculation units 161 and 261. Since the same processing is performed in the current limit value calculation units 161 and 261, the processing of the first current limit value calculation unit 161 will be described, but in the processing in the second current limit value calculation unit 261, a value involved in the first system L1 and a value involved in the second system L2 may be replaced with each other as appropriate. The same applies to flowcharts according to the embodiments shown in FIGS. 22 to 24 and described later.

In S311, the first current limit value calculation unit 161 determines whether or not the first individual current limit value Ilim_k1 is less than the second individual current limit value Ilim_k2. When it is determined that the first individual current limit value Ilim_k1 is less than the second individual current limit value Ilim_k2 (YES in S311), the process proceeds to S312, and the first current limit value Ilim1 is set as the first individual current limit value Ilim_k1. When it is determined that the first individual current limit value Ilim_k1 is equal to or larger than the second individual current limit value Ilim_k2 (NO in S311), the process proceeds to S313, and the first current limit value Ilim1 is set as the second individual current limit value Ilim_k2.

Figure 22:
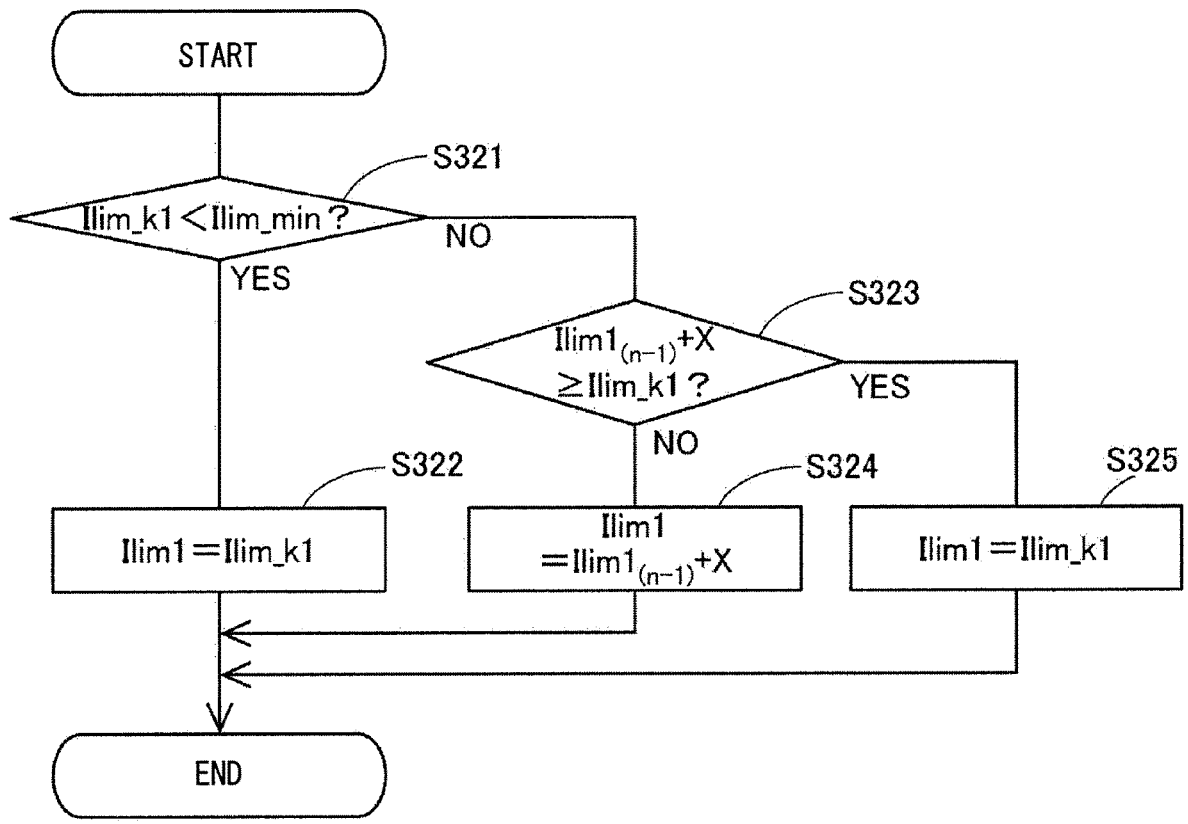
FIG. 22 is a flowchart illustrating the current limit value calculation processing according to the fifth embodiment.

FIG. 22 is a flowchart illustrating the current limit value calculation processing in the control mode M2. In S321, the first current limit value calculation unit 161 determines whether or not the first individual current limit value Ilim_k1 is less than the limit lower limit value Ilim_min. When it is determined that the first individual current limit value Ilim_k1 is less than the limit lower limit value Ilim_min (YES in S321), the process proceeds to S322, and the first individual current limit value Ilim1 is set to the first individual current limit value Ilim_k1. When it is determined that the first individual current limit value Ilim_k1 is equal to or larger than the limit lower limit value Ilim_min (NO in S321), the process proceeds to S323.

In S323, the first current limit value calculation unit 161 determines whether or not a value obtained by adding an increment X to a previous value of the first current limit value Ilim1 is equal to or greater than the first individual current limit value Ilim_k1. Hereinafter, the previous value of the current limit value Ilim1 is set as a current limit value Ilim1$_{(n-1)}$. When it is determined that the value obtained by adding the increment X to the previous current limit value is less than the first individual current limit value Ilim_k1 (NO in S323), the process proceeds to S324, and the current limit value Ilim1 is set as a value obtained by adding the increment X to the previous current limit value Ilim1$_{(n-1)}$. If it is determined that the value obtained by adding the increment X to the previous current limit value Ilim1$_{(n-1)}$ is equal to or more than the first discrete current limit value Ilim_k1 (YES in S323), the process proceeds to S325 and the current limit value Ilim1 is set to the individual current limit value Ilim_k1.

Figure 23:
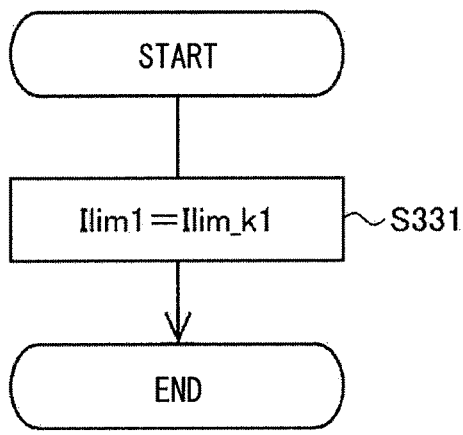
FIG. 23 is a flowchart illustrating the current limit value calculation processing according to the fifth embodiment.

FIG. 23 is a flowchart illustrating a current limit value calculation processing in the control mode M3. In S331, the first current limit value calculation unit 161 sets the first current limit value Ilim1 to the first individual current limit value Ilim_k1.

Figure 24:
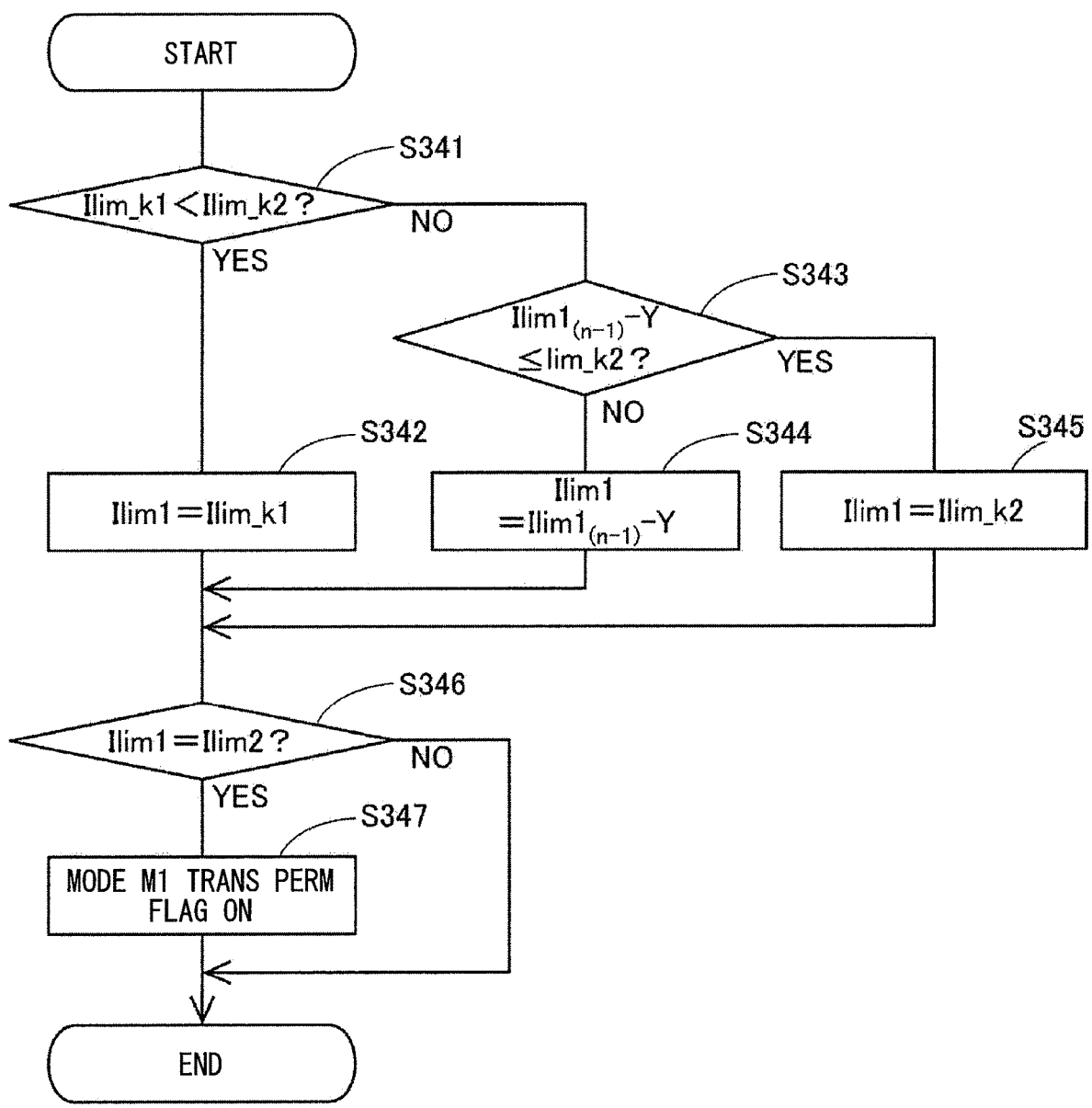
FIG. 24 is a flowchart illustrating the current limit value calculation processing according to the fifth embodiment.

FIG. 24 is a flowchart illustrating a current limit value calculation processing in the control mode M4. In S341, the first current limit value calculation unit 161 determines whether or not the first individual current limit value Ilim_k1 is less than the second individual current limit value Ilim_k2. When it is determined that the first individual current limit value Ilim_k1 is less than the second individual current limit value Ilim_k2 (YES in S341), the process proceeds to S342, and the first current limit value Ilim1 is set as the first individual current limit value Ilim_k1. When it is determined that the first individual current limit value Ilim_k1 is equal to or larger than the second individual current limit value Ilim_k2 (NO in S341), the process proceeds to S343.

In S343, the first current limit value calculation unit 161 determines whether or not a value obtained by subtracting a decrement Y from the previous current limit value Ilim1$_{(n-1)}$ is equal to or less than the second individual current limit value Ilim_k2. When it is determined that the value obtained by subtracting the decrement Y from the previous current limit value Ilim1$_{(n-1)}$ is larger than the second individual current limit value Ilim_k2 (NO in S343), the process proceeds to S344, and the first current limit value Ilim1 is set as a value obtained by subtracting the decrement Y from the previous current limit value Ilim1$_{(n-1)}$. When it is determined that the value obtained by subtracting the decrement Y from the previous current limit value Ilim1$_{(n-1)}$ is equal to or less than the second individual current limit value Ilim_k2 (YES in S343), the process proceeds to S345, and the first current limit value Ilim1 is set as the second individual current limit value Ilim_k2.

In S346, the first current limit value calculation unit 161 determines whether or not the first current limit value Ilim1 and the second current limit value Ilim2 match with each other. If it is determined that the first current limit value Ilim1 does not match with the second current limit value Ilim2 (NO in S346), S347 is not performed, and the routine ends. When it is determined that the first current limit value Ilim1 matches the second current limit value Ilim2 (YES in S346), the process proceeds to S347, and the mode M1 transition permission flag is set.

The current limit value calculation processing according to the present embodiment will be described with reference to a time chart of FIG. 25. Until a time x20, the individual current limit values Ilim_k1 and are substantially equal to each other. The second individual current limit value Ilim_k2 decreases from the time x20. Until a time x21, since the individual current limit values Ilim_k1 and Ilim_k2 are equal to or larger than the limit lower limit value Ilim_min, the control mode M1 is set, and the current limit values Ilim1 and Ilim2 are shared by the minimum selection. In other words, during a period from the time x20 to the time x21, the current limit values Ilim1 and Ilim2 are both set to the second individual current limit value Ilim_k2.

At time x21, when the second individual current limit value Ilim_k2 is less than the limit lower limit value Ilim_min, the control mode M2 is shifted. In the control mode M2, the current limit values Ilim1 and Ilim2 are not shared. At the time x21, the first current limit value Ilim1 drops to the limit lower limit value Ilim_min and deviates from the first individual current limit value Ilim_k1. Therefore, the first current limit value Ilim1 is returned to the first individual current limit value Ilim_k1 by gradually increasing the first current limit value Ilim1 by the increment X, and the first current limit value Ilim1 matches with the first individual current limit value Ilim_k1 at a time x22.

At a time x23, when the second individual current limit value Ilim_k2 becomes equal to or larger than the limit lower limit value Ilim_min, the control mode is transitioned to the control mode M4. In the control mode M4, the individual current limit values Ilim_k1 and Ilim_k2 are both equal to or higher than the limit lower limit value Ilim_min, but the current limit values are not shared. The control mode M4 can be regarded as a transition mode for transiting to the control mode M1, and the first current limit value Ilim1 is gradually decreased by the decrement Y in order to share the current limit values Ilim1 and Ilim2. With a decrease in the first current limit value Ilim1 to the second individual current limit value Ilim_k2, the current limit values Ilim1 and Ilim2 are shared more quickly than that when the first current limit value Ilim1 is not decreased, to thereby improve the NV performance. When the current limit values Ilim1 and Ilim2 match with each other at a time x24, the mode shifts from the control mode M4 to the control mode M1.

The increment X and the decrement Y can be appropriately set. In FIG. 25, the increment X and the decrement Y are made constant and the current limit value Ilim1 is linearly increased or decreased, but may be increased or decreased non-linearly, such as a secondary function or an exponential function. The same applies to the seventh embodiment.

When the control mode M1 is transitioned to the control mode M2, the current limit value Ilim1 is gradually increased, thereby being capable of securing an output while reducing a driver's sense of discomfort. Further, the increment X is set to a sufficiently large value and the current limit value Ilim1 is rapidly increased to the first individual current limit value Ilim_k1, thereby being capable of rapidly maximizing the output.

Furthermore, when the increment X is set to 0, the current limit value Ilim1 is held at the limit lower limit value Ilim_min during the control mode M2, as shown in FIG. 15. Supplementally, referring to FIG. 15, the control mode M1 is set before the time 11 and after the time x12, and the control mode M2 is set between the time x11 and the time X12. In this instance, since the current limit values Ilim1 and Ilim2 are shared at the time x12, it can be considered that the mode is transitioned to the control mode M1 without passing through the control mode M4.

Alternatively, the current limit value Ilim1 may be changed by setting the increment X in accordance with the steering state. For example, the current limit value Ilim1 is gradually increased during steering and the driver is caused to sense a change in a weight of the steering wheel, thereby being capable of reducing a risk due to a change in output. Further, with a rapid increase in the current limit value Ilim1 at the time of abrupt steering, it is possible to improve an emergency avoidance performance. Further, at the time of low speed traveling, a risk associated with a decrease in the steering force is low, and a need for outputting the EPS is large, so that the increment X may be set to a relatively large value, and an increase acceleration of the current limit value Ilim1 may be increased.

Figure 25:
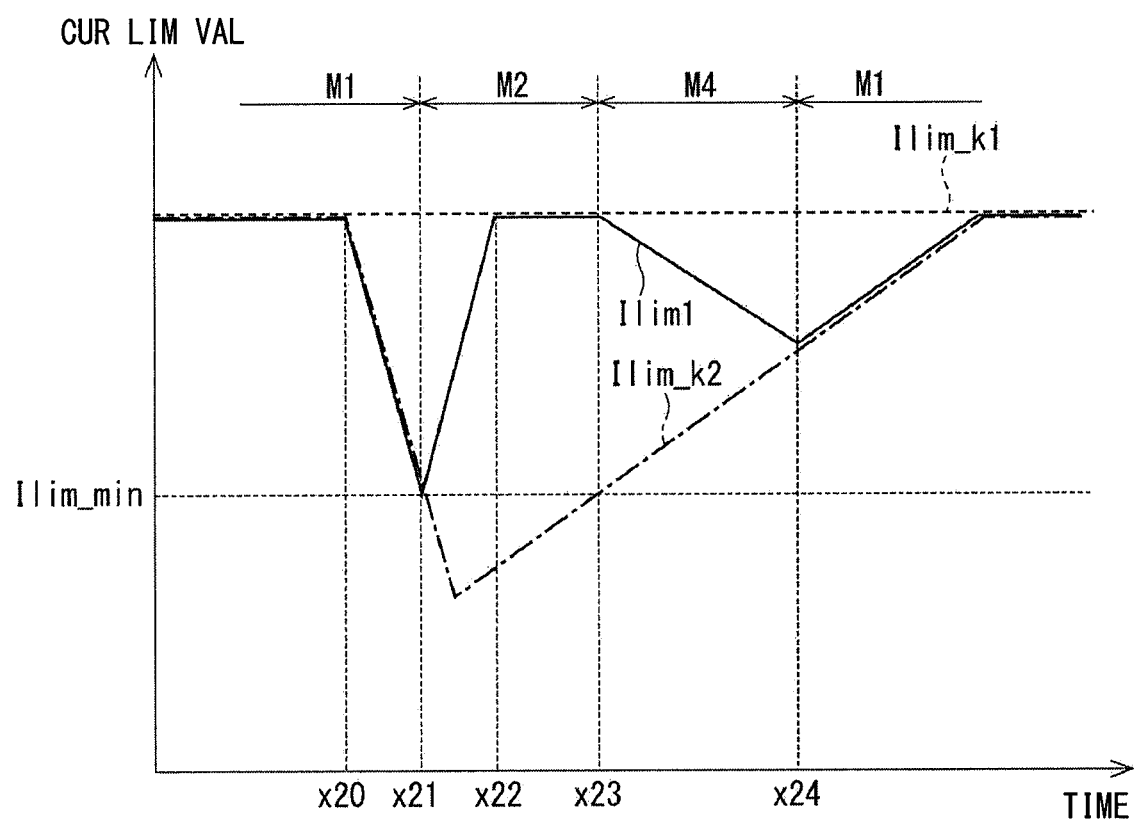
FIG. 25 is a time chart illustrating the current limit value calculation processing according to the fifth embodiment.
Figure 26:
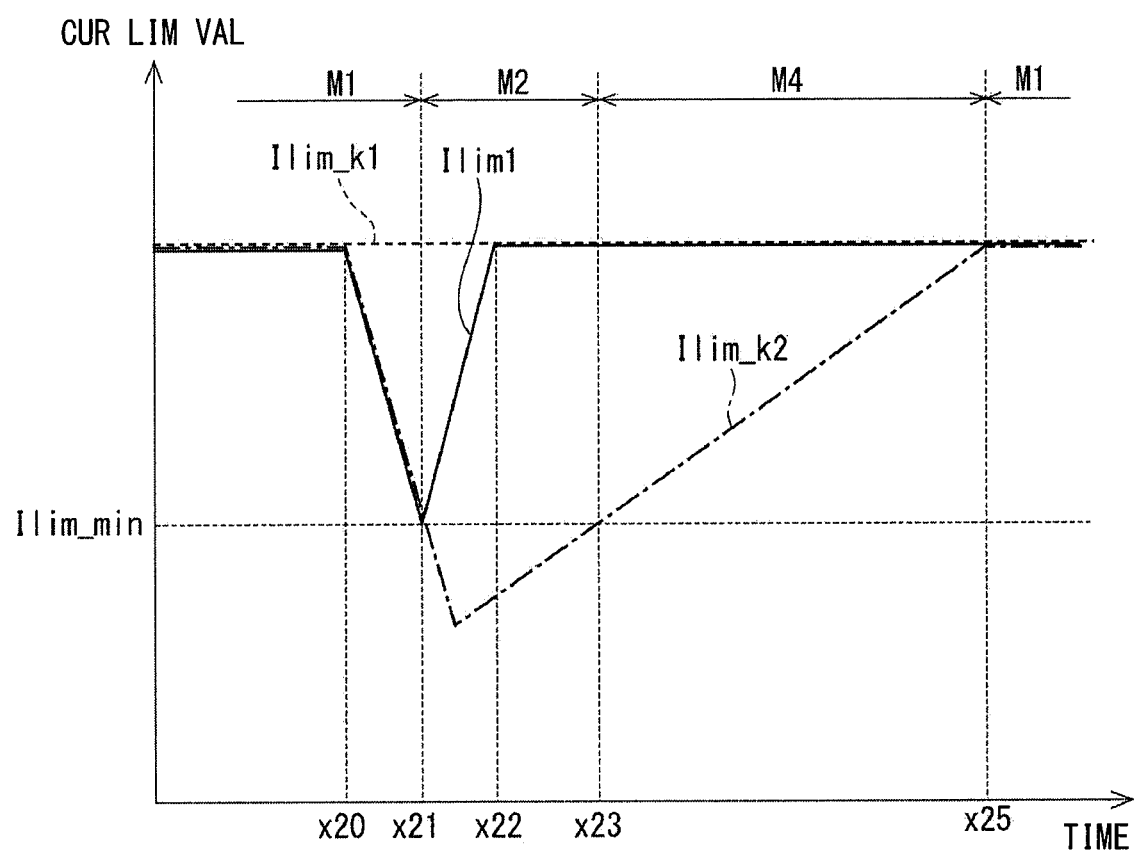
FIG. 26 is a time chart illustrating the current limit value calculation processing according to the fifth embodiment.

In FIG. 25, the current limit value Ilim1 is gradually decreased when the mode transitions from the control mode M2 to the control mode M4. Further, as shown in FIG. 26, the stabilization of the assist torque and the securing of the output may be prioritized over the reduction in vibration and noise by sharing the current limit value, the decrement Y may be set to 0, and the current limit value Ilim1 may be held without being reduced. In other words, in FIG. 26, even if the second individual current limit value Ilim_k2 becomes equal to or larger than the limit lower limit value Ilim_min at a time x23, the current limit value Ilim1 is maintained by setting the decrement Y to 0. In that case, the control mode M4 is continued until a time x25 at which the individual current limit values Ilim_k1 and Ilim_k2 match with each other and the mode is transitioned to the control mode M1 at the time x25.

Furthermore, when the second individual current limit value Ilim_k2 is larger than the first current command value I1*, the current limit value Ilim1 may be abruptly decreased. In that instance, since the steering force does not vary even if the current limit value Ilim1 is abruptly decreased, the current limit values Ilim1 and Ilim2 can be quickly shared.

In the present embodiment, the current limit value calculation units 161 and 261 gradually increase the current limit values Ilim1 and Ilim2 of the host system to the individual current limit values Ilim_k1 and Ilim_k2 when transitioning from the control mode M1, which is the current limit value sharing mode, to the control modes M2 and M3, which are the current limit value non-sharing mode.

The current limit value calculation units 161 and 261 gradually change the values so as to match the shared current limit value when transitioning from the current limit value non-sharing mode to the current limit value sharing mode. In the present embodiment, the shared current limit value is the smallest value among the individual current limit values Ilim_k1 and Ilim_k2 of the respective systems. This makes it possible to appropriately switch between the current limit value sharing mode and the current limit value non-sharing mode. In addition, the same effects as those of the above embodiment can be obtained.

Sixth Embodiment

A sixth embodiment will be described with reference to FIGS. 27 to 29. In the above embodiments, the description has been made mainly focusing on the sharing of the current limit value. In the present embodiment, a current control according to the sharing conditions of the current limit values Ilim1 and Ilim2 will be described. The method of setting the current limit values Ilim1 and Ilim2 may employ any method of the above embodiments.

When the current limit values Ilim1 and Ilim2 are shared and equal to each other, the values of the respective systems are commonly used to control the energization of the respective systems. More specifically, as shown in FIG. 27, the current detection values Id1, Iq1, Id2, and Iq2 are mutually transmitted and received by the inter-microcomputer communication to perform the sum and difference. Although a dq-axis current is transmitted and received in this example, for example, a three-phase current may be transmitted and received. In FIG. 27, a current feedback calculation involved in a q-axis will be mainly described. Since the current feedback calculation involved in the d-axis is the same as that of the q-axis, the description and the illustration will be omitted as appropriate.

Figure 27:
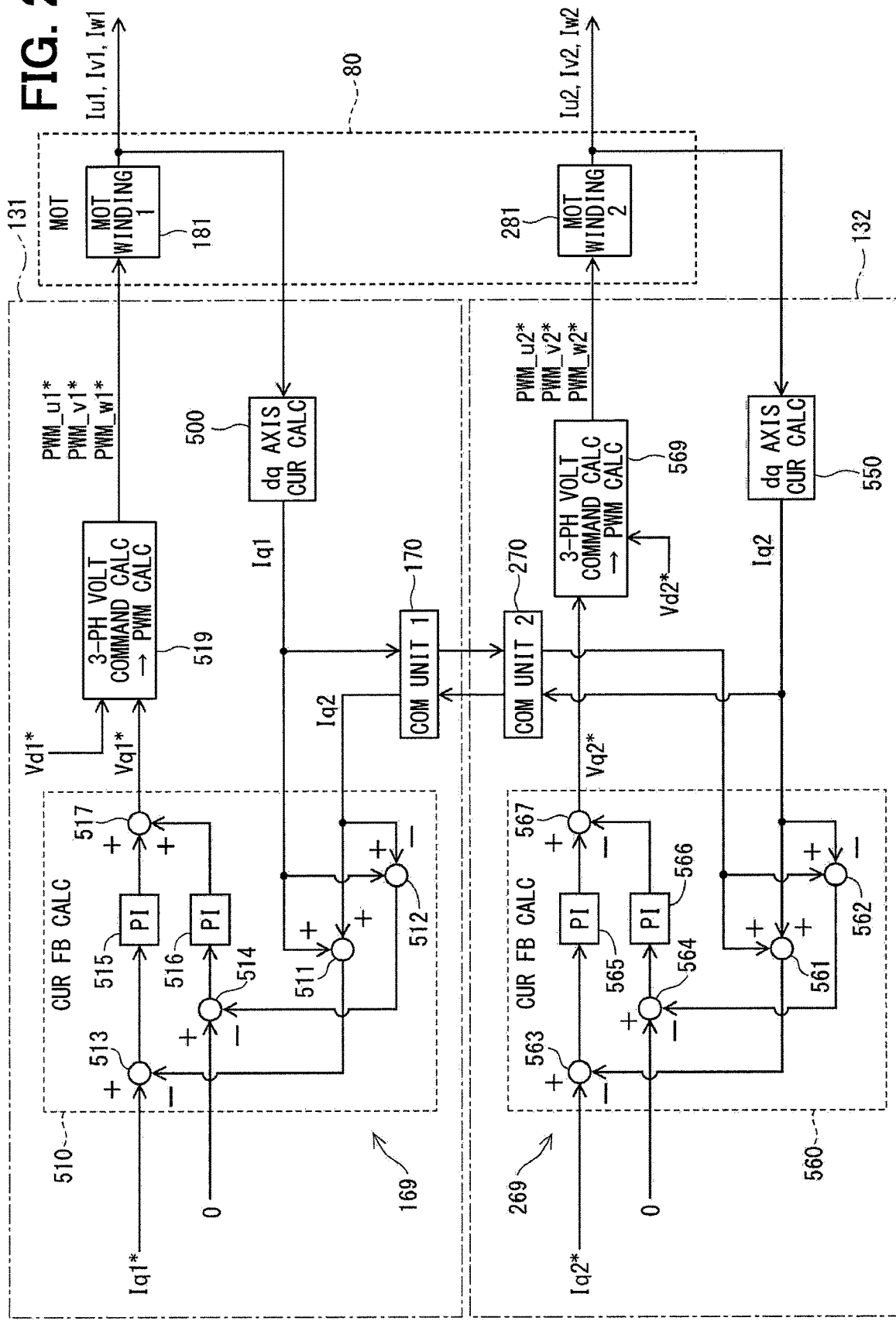
FIG. 27 is a block diagram illustrating a sum and a difference control according to a sixth embodiment.

A dq-axis current calculation unit 500 calculates a first d-axis current detection value Id1 and a first q-axis current detection value Iq1 based on a detection value of a current sensor 125 (not shown in FIG. 27). The dq-axis current detection values Id1 and Iq1 are transmitted to a second control unit 231 by an inter-microcomputer communication.

A first current feedback calculation unit 510 includes an adder 511, subtracters 512 to S14, controllers 515 and 516, and an adder 517. The adder 511 adds the q-axis current detection values Iq1 and Iq2 to calculate a q-axis current sum Iq_a1. The subtractor 512 subtracts the second q-axis current detection value Iq2 from the first q-axis current detection value Iq1 to calculate a q-axis current difference Iq_d1.

The subtractor 513 subtracts the q-axis current sum Iq_a1 from the q-axis current command value Iq1* to calculate a current sum deviation ΔIq_a1. The subtractor 514 subtracts the q-axis current difference Iq_d1 from the current difference command value to calculate a current difference deviation ΔIq_d1. In the present embodiment, the current difference command value is set to 0, and the control is performed so as to eliminate a current difference between the systems. The current difference command value may be set to a value other than 0, and control may be performed so that a desired current difference occurs between the systems.

The controller 515 calculates a q-axis basic voltage command value Vq_b1* by, for example, PI calculation or the like so that the current sum deviation ΔIq_a1 becomes 0. The controller 516 calculates a q-axis differential voltage command value Vq_d1* by, for example, PI calculation or the like so that the current difference deviation ΔIq_d1 becomes 0. The adder 517 adds the q-axis basic voltage command value Vq_b1* and the q-axis differential voltage command value Vq_d1* to calculate a q-axis voltage command value Vq1*.

A signal generation unit 519 calculates three-phase voltage command values Vu1*, Vv1*, and Vw1* by inverse dq-converting the voltage command values Vd1* and Vq1*. The signal generation unit 519 calculates PWM signals PWM_u1*, PWM_v1*, and PWM_v1* by PWM calculation.

A dq-axis current calculation unit 550 calculates a second d-axis current detection value Id2 and a second q-axis current detection value Iq2 based on the detection value of a current sensor 225 (not shown in FIG. 27). The dq-axis current detection values Id2 and Iq2 are transmitted to a first control unit 131 by a inter-microcomputer communication.

A first current feedback calculation unit 560 includes an adder 561, subtracters 562 to 564, controllers 565 and 566, and an adder 567. The adder 561 adds the q-axis current detection values Iq1 and Iq2 to calculate a q-axis current sum Iq_a2. The subtractor 562 subtracts the second q-axis current detection value Iq2 from the first q-axis current detection value Iq1 and calculates a q-axis current difference Iq_d2.

The subtractor 563 subtracts the q-axis current sum Iq_a2 from the q-axis current command value Iq2* to calculate a current sum deviation ΔIq_a2. The subtractor 564 subtracts the q-axis current difference Iq_d2 from a current difference command value to calculate a current difference deviation ΔIq_d2.

In the controller 565, the q-axis basic voltage command value Vq_b 2* is calculated by, for example, PI calculation or the like so that the current sum deviation ΔIq_a 2 becomes 0. The controller 566 calculates a q-axis differential voltage command value Vq_d2* by, for example, PI calculation or the like so that the current difference deviation ΔIq_d2 becomes 0. The adder 567 adds the q-axis basic voltage command value Vq_b2* and the q-axis differential voltage command value Vq_d2* to calculate a q-axis voltage command value Vq2*.

A signal generation unit 569 calculates three-phase voltage command values Vu2*, Vv2*, and Vw2* by inverse dq-converting the voltage command values Vd2* and Vq2*. The signal generation unit 569 calculates PWM signals PWM_u2*, PWM_v2*, and PWM_w2* by PWM calculation.

Figure 28:
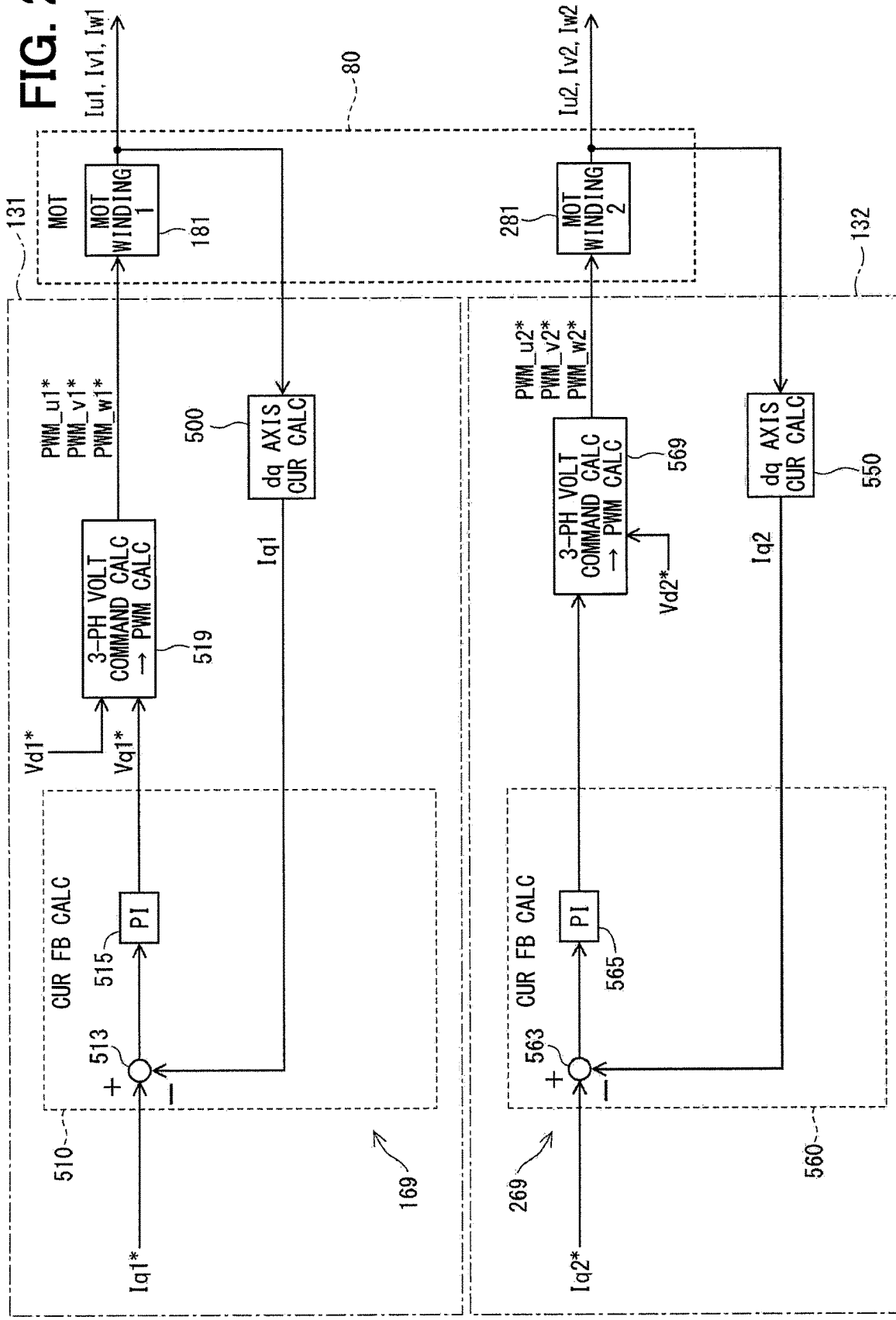
FIG. 28 is a block diagram illustrating an independent driving control according to the sixth embodiment.
Figure 29:
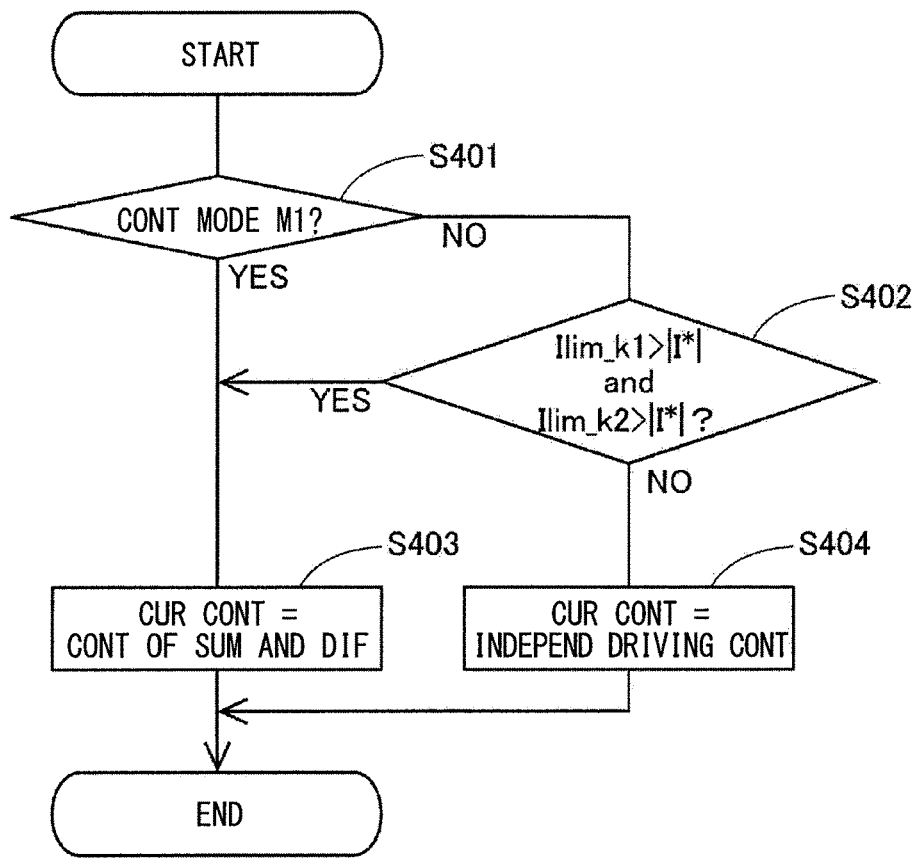
FIG. 29 is a flowchart illustrating a current control selection processing according to the sixth embodiment.

As shown in FIG. 28, when the current limit values Ilim1 and Ilim2 are not shared, the sum and difference are not controlled, and independent driving control is performed in which a current control is performed for each system. Even when the current limit values are not shared, when the pre-limit current command value I* is smaller than current limit values Ilim1 and Ilim2 and match with each other, the sum and difference are controlled.

As shown in FIG. 28, the subtractor 513 subtracts the q-axis current detection value Iq1 from the q-axis current command value Iq1* to calculate a q-axis current deviation ΔIq1. The controller 515 calculates a q-axis voltage command value Vq1* so that the q-axis current deviation ΔIq1 becomes 0.

The subtractor 563 subtracts the q-axis current detection value Iq2 from the q-axis current command value Iq2* to calculate a q-axis current deviation ΔIq2. The controller 56 calculates the q-axis voltage command value Vq2* so that the q-axis current deviation ΔIq2 becomes 0.

In a control signal calculation unit 169 of FIG. 28, the adder 511 and the like in FIG. 27 are omitted for simplification, but in a independent driving control, the q-axis current detection value Iq2 acquired from the second control unit 231 may be set to 0, and the PI calculation of the difference in the controller 516 may be stopped. Similarly, in an independent driving control in a control signal calculation unit 269, the q-axis current detection value Iq1 acquired from the first control unit 131 may be set to 0, and the PI calculation of a difference in the controller 566 may be stopped.

In this example, if the current command values before the limitation are equal to each other and the current limit values Ilim1 and Ilim2 are shared, the current command values after the limitation are the same value. Even if the current limit values Ilim1 and Ilim2 are not shared, if the current command values before limitation are equal to each other and are smaller than the individual current limit values Ilim_k1 and Ilim_k2, the current command values after limitation are equal to each other. Hereinafter, it is assumed that the values before limitation are equal to each other, and the current command value before limitation is defined as a pre-limitation current command value I*.

A current control selection processing according to the present embodiment will be described with reference to a flowchart of FIG. 29. Since the processing in the control units 131 and 231 is the same, the processing in the first control unit 131 will be described, and the description of the processing in the second control unit 231 will be omitted.

In S401, the first control unit 131 determines whether or not a current limit value calculation mode is a control mode M1 (refer to FIG. 20). When it is determined that the control mode M1 is set (YES in S401), the process proceeds to S403. When it is determined that the current limit value calculation mode is not the control mode M1 (NO in S401), that is, when the current limit value calculation mode is any one of the control modes M2 to M4, the process proceeds to S402.

In S402, the first control unit 131 determines whether or not both the individual current limit values Ilim_k1 and Ilim_k2 are larger than an absolute value of the pre-limit current command value I*. When it is determined that both the individual current limit values and Ilim_k2 are larger than the absolute value of the pre-limit current command value I* (YES in S402), the process proceeds to S403. When it is determined that at least one of the individual current limit values Ilim_k1 and Ilim_k2 is equal to or smaller than the absolute value of the pre-limit current command value I* (NO in S402), the process proceeds to S404.

In S403, the first control unit 131 sets the current control as the sum and difference controls. In S404, the first control unit 131 sets the current control as an independent driving control.

In this example, a current control in the above embodiment will be referred to. In the example of FIG. 15, before a time x11 and after a time x12, the current control is set as the sum and difference control, and between the time x11 and time x12, the current control is set as the independent driving control. In the example of FIG. 25, before a time x21 and after a time x24, the current control is set as the sum and difference control, and between the time x21 and time x24, the current control is set as the independent driving control. In the example of FIG. 26, before a time x21 and after a time x25, the current control is set as the sum and difference control, and between the time x21 and the time x25, the current control is set as the independent driving control. In the examples of FIG. 15, FIG. 25, and FIG. 26, when the current command values I1* and I2* are smaller than the individual current limit values Ilim_k1 and Ilim_k2 and the current command values I1* and I2* match with each other between the systems, the current control is assumed to be the sum and difference control even during periods in which the individual current limit values Ilim_k1 and Ilim_k2 do not match with each other.

In the present embodiment, when the current command values I1* and I2* match with each other between the systems, the control signal calculation units 169 and 269 control the sum and the difference to generate the control signal so that the current sum of the respective systems becomes the current sum command value and the current difference becomes the current difference command value. When the current command values I1* and I2* do not match with each other between the systems, the control signal calculation units 169 and 269 perform independent driving control for generating a control signal based on the current command values I1* and I2* of the host system.

When the current command values I1* and I2* match with each other between the systems, a deviation between the torque command value Trq and the output torque can be reduced by controlling the sum and difference of the current control, and a desired torque can be output from the motor 80. In addition, the influence of the mutual inductance can be canceled. Furthermore, the control is made so that a current difference between the systems becomes 0, thereby being capable of uniforming a heat generation in each system. In addition, when the current command values I1* and I2* do not match with each other between the systems, the current control is set as the independent driving control, thereby being capable of appropriately performing the current control without causing mismatch due to command mismatch. In addition, the same effects as those of the above embodiment can be obtained.

Seventh Embodiment

Figure 30:
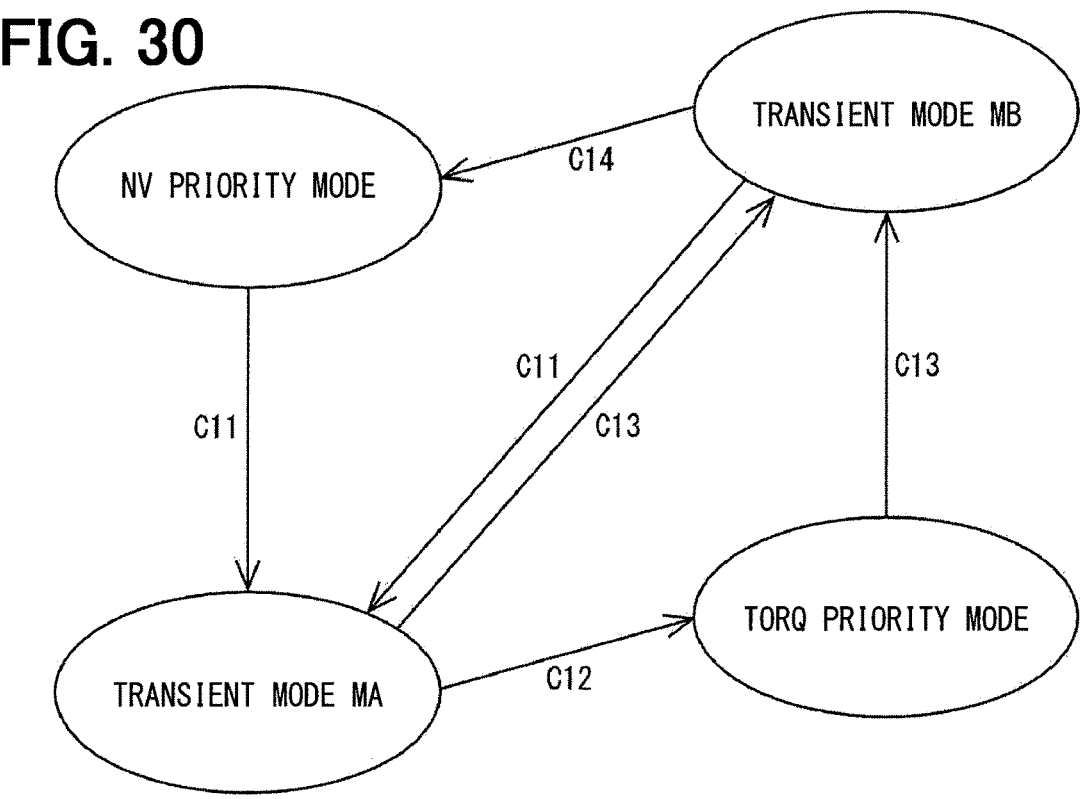
FIG. 30 is a transition diagram illustrating a mode transition according to a seventh embodiment.
Figure 31:
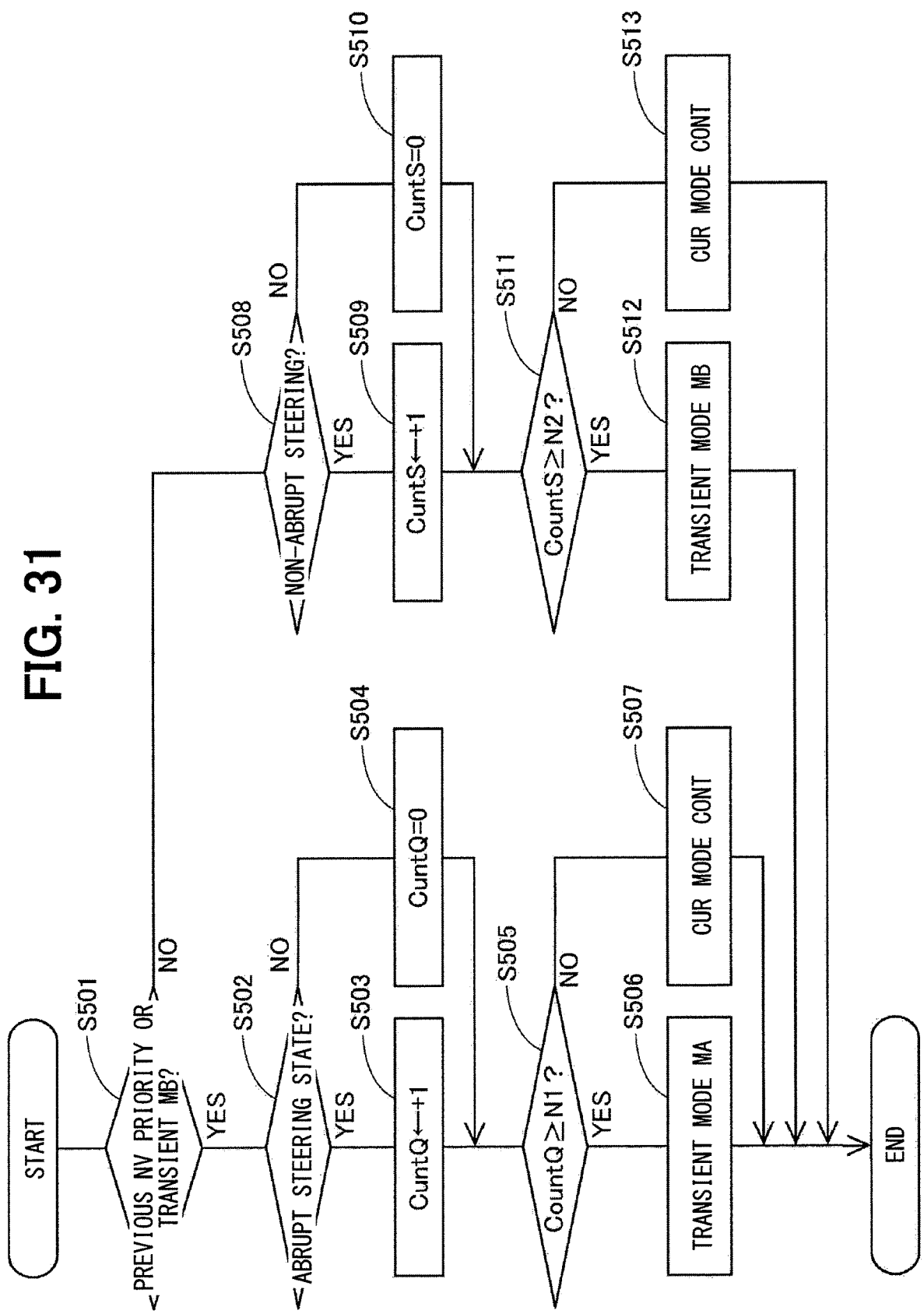
FIG. 31 is a flowchart illustrating the current limit value calculation processing according to the seventh embodiment.
Figure 32:
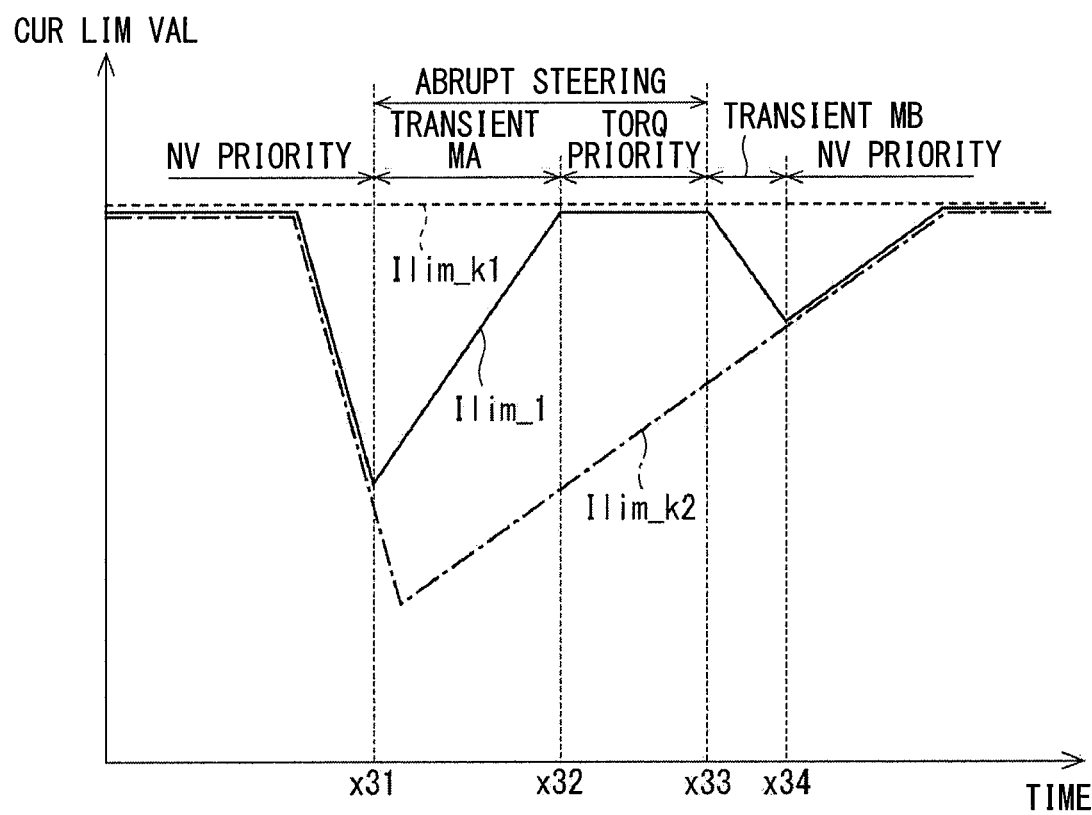
FIG. 32 is a time chart of the current limit value calculation processing according to the seventh embodiment.

FIGS. 30 to 32 show a seventh embodiment. In the present embodiment, the current limit values Ilim1 and Ilim2 are switched between sharing and non-sharing according to the steering states. In the present embodiment, as shown in FIG. 30, the transition is made to the four control modes corresponding to the steering states, to thereby switch between sharing and non-sharing of the current limit values Ilim1 and Ilim2.

In an NV priority mode, the current limit values Ilim1 and Ilim2 are shared by the minimum selection. In a torque priority mode, an independent limit control is performed in which the current limit value is not shared. Further, in the torque priority mode, instead of the independent limit control, a high selection may be used in which a value having the higher current limit value is temporarily shared in order to compensate for an output shortage. In the present embodiment, the NV priority mode is set at the time of non-abrupt steering, and the torque priority mode is set at the time of abrupt steering.

A transient mode MA is a mode through which a transition from the NV priority mode to the torque priority mode is made. A transient mode MB is a mode through which a transition from the torque priority mode to the NV priority mode is made. In addition, the steering states of the NV priority mode and the transient mode MB are non-abrupt steering states, and the steering states of the torque priority mode and the transient mode MA are abrupt steering states.

In the NV priority mode, the current limit values Ilim1 and Ilim2 are shared by the minimum selection, and in the torque priority mode and the transient modes MA and MB, the current limit values Ilim1 and Ilim2 are not shared. In other words, in a time chart of FIG. 32, which will be described later, the current limit value sharing mode is performed before a time x31 and after a time x34, and the current limit value non-sharing mode is performed from the time x31 to the time x34.

A mode transition will be described. A transition condition C11 is a state change from a non-abrupt steering state to an abrupt steering state. A transition condition C12 is that the current limit values Ilim1 and Ilim2 match with the individual current limit values Ilim_k1 and Ilim_k2, respectively. A transition condition C13 is a state change from the abrupt steering state to the non-abrupt steering state. A transition condition C14 is that the current limit values Ilim1 and Ilim2 match with each other.

A current limit value calculation processing will be described with reference to a flowchart of FIG. 31. In S501, the current limit value calculation unit 161 determines whether or not the control mode in the previous calculation is the NV priority mode or the transient mode MB. When it is determined that the control mode in the previous calculation is not the NV priority mode or the transient mode MB (NO in S501), that is, when the control mode in the previous calculation is the torque priority mode or the transient mode MA, the process proceeds to S508. When it is determined that the control mode in the previous calculation is the NV priority mode or the transient mode MB (YES in S501), the process proceeds to S502.

In S502, the current limit value calculation unit 161 determines whether or not the vehicle is in a abrupt steering state based on abrupt steering determination parameters. In this example, the abrupt steering determination parameters include a steering torque Ts, a steering speed ω, and a vehicle speed Vspd. When the steering torque Ts is larger than an abrupt steering determination torque Ts_q, the steering speed ω is larger than an abrupt steering determination speed ω_q, and the vehicle speed Vspd is larger than an abrupt steering determination vehicle speed Vspd_q, it is determined that the vehicle is in the abrupt steering state. In other words, when Ts>Ts_q_q, ω>ω_q, and Vspd>Vspd_q are all satisfied, the abrupt steering determination is performed. In the abrupt steering determination, the determination involved in some parameters may be omitted, or other parameters such as, for example, a current deviation may be further used. When it is determined that the steering state is the abrupt steering state (YES in S502), the process proceeds to S503. When it is determined that the steering state is not the abrupt steering state (NO in S502), the process proceeds to S504.

In S503, the current limit value calculation unit 161 increments a count value CountQ of the abrupt steering determination counter. In S504, the current limit value calculation unit 161 resets the count value CountQ of the abrupt steering determination counter.

In S505, the current limit value calculation unit 161 determines whether or not the count value CountQ of the abrupt steering determination counter is equal to or greater than a determination threshold N1. When it is determined that the count value CountQ is equal to or larger than the determination threshold N1 (YES in S505), the current limit value calculation unit 161 determines that the transition condition C11 is satisfied, and the process proceeds to S506. When it is determined that the count value CountQ is less than the determination threshold N1 (NO in S505), the process proceeds to S507.

In S506, the current limit value calculation unit 161 sets the control mode to the transient mode MA, and switches the current limit form to the independent limit control. In the transient mode MA, if the first current limit value Ilim1 matches with the first individual current limit value Ilim_k1 and the second current limit value Ilim2 matches with the second individual current limit value Ilim_k2, the mode transitions to the torque priority mode. In S507, the current limit value calculation unit 161 continues the current control mode.

In S508 to which the process proceeds when the control mode at the time of the previous calculation is the torque priority mode or the transient mode MA, the current limit value calculation unit 161 determines whether or not the steering state is the non-abrupt steering state based on the abrupt steering determination parameter. When the steering torque Ts is equal to or less than a non-abrupt steering determination torque Ts_s, the steering speed ω is equal to or less than a non-abrupt steering determination speed ω_s, or the vehicle speed Vspd is equal to or less than an abrupt steering determination vehicle speed Vspd_s, it is determined that the vehicle is in the non-abrupt steering state. In other words, when Ts≤Ts_s_q, ω≤ω_s, or Vspd≤Vspd_s, non-abrupt steering determination is performed. The thresholds Ts_q, ω_q and Vspd_q used for the abrupt steering determination in S502 may be the same as or different from the thresholds Ts_s, ω_s and Vspd_s used for the non-abrupt steering determination in S508. When it is determined that the steering state is the non-abrupt steering state (YES in S508), the process proceeds to S509. When it is determined that the steering state is not the non-abrupt steering state (NO in S508), the process proceeds to S509.

In S509, the current limit value calculation unit 161 increments the count value CountS of the non-abrupt steering determination counter. In S510, the current limit value calculation unit 161 resets the count value CountS of the non-abrupt steering determination counter.

In S511, the current limit value calculation unit 161 determines whether or not the count value CountS of the non-abrupt steering determination counter is equal to or larger than a determination threshold N2. The determination threshold N2 may be the same as or different from the determination threshold N1 in S505. When it is determined that the count value CountS is equal to or larger than the determination threshold N2 (YES in S511), the current limit value calculation unit 161 determines that the transition condition C14 is satisfied, and the process proceeds to S512.

When it is determined that the count value CountS is less than the determination threshold N2 (NO in S511), the process proceeds to S513.

In S512, the current limit value calculation unit 161 sets the control mode to the transient mode MB. When the current limit values Ilim1 and Ilim2 match with each other in the transient mode MB, the mode shifts to the NV priority mode. In S513, the current limit value calculation unit 161 continues the current control mode.

The current limit value calculation processing will be described with reference to a time chart of FIG. 32. Until a time x31 in the non-abrupt steering state, the control mode is the NV priority mode, and the current limit mode is the minimum selection.

At the time x31, when the steering state becomes the abrupt steering state, the control mode is set to the transient mode MA in order to shift the current limit mode to the independent limit control. In the transient mode MA, for example, as in the fifth embodiment, the current limit value Ilim1 is gradually increased by the increment X. When the current limit value Ilim1 matches with the individual current limit value Ilim_k1 at a time x32, the control mode becomes the torque priority mode. The current limit mode at this time is the independent limit control.

At a time x33, when the abrupt steering state is changed to the non-abrupt steering state, the control mode is set to the transient mode MB in order to shift the current limit mode to the minimum selection. In the transient mode MB, for example, as in the fifth embodiment, the current limit value Ilim1 is gradually decreased by the decrement Y. When the current limit values Ilim1 and Ilim2 match with each other at a time x34, the control mode returns to the NV priority mode. The current limit form at this time is the minimum selection.

The increment X and the decrement Y are set to sufficiently large values, so that the current limit value Ilim1 may not be gradually changed, and the NV priority mode and the torque priority mode may be switched substantially without passing through the transient modes MA and MB. The same applies to the eighth embodiment.

In the present embodiment, the current limit value calculation units 161 and 261 are set to the current limit value non-sharing mode at the time of the output priority when the output from the motor 80 is prioritized. When a high output from the motor 80 is required at the time of abrupt steering or the like, the required output can be secured by making the current limit values Ilim1 and Ilim2 non-shared. In the present embodiment, the abrupt steering corresponds to the "output priority mode", but the current limit value non-sharing mode can be set also at the time of the output priority other than the abrupt steering. For example, when one of the battery voltages Vb1 and Vb2 falls below a voltage threshold, the mode may be regarded as the output priority time and the mode may be shifted to the current limit value non-sharing mode. In addition, the same effects as those of the above embodiment can be obtained.

Eighth Embodiment

Figure 33:
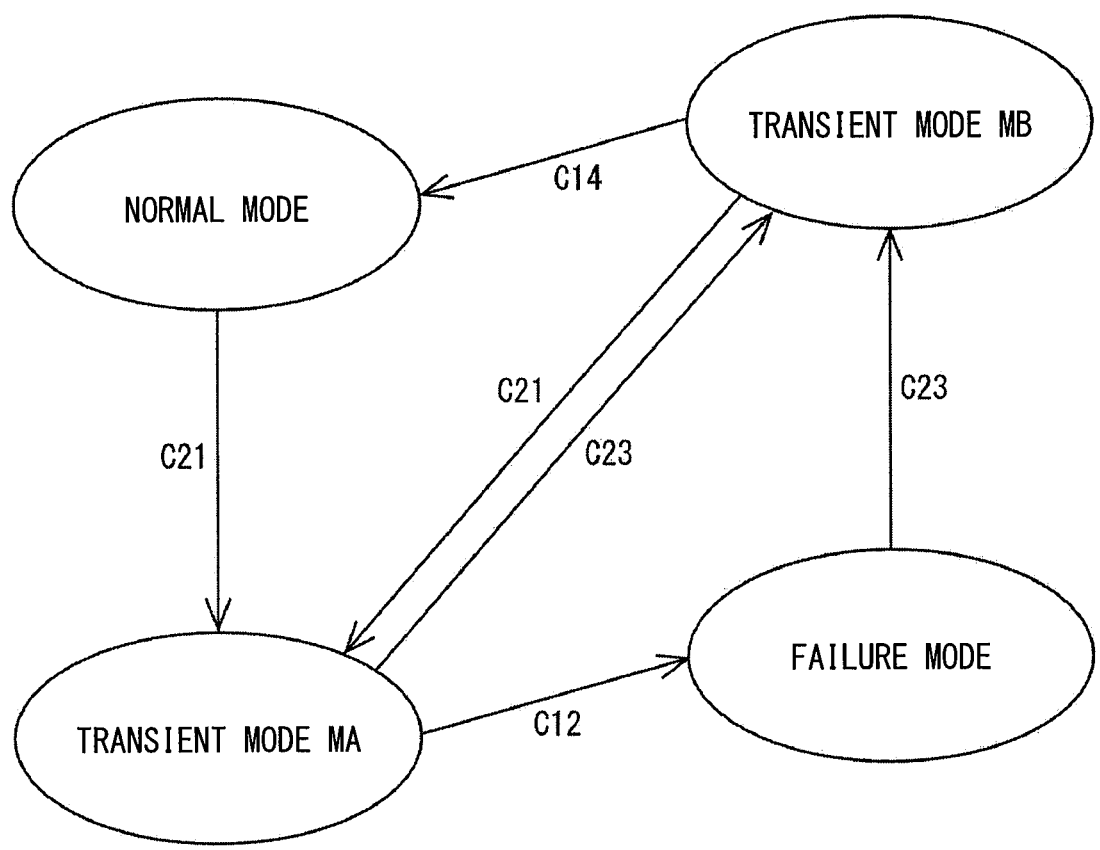
FIG. 33 is a transition diagram illustrating a mode transition according to an eighth embodiment.
Figure 34:
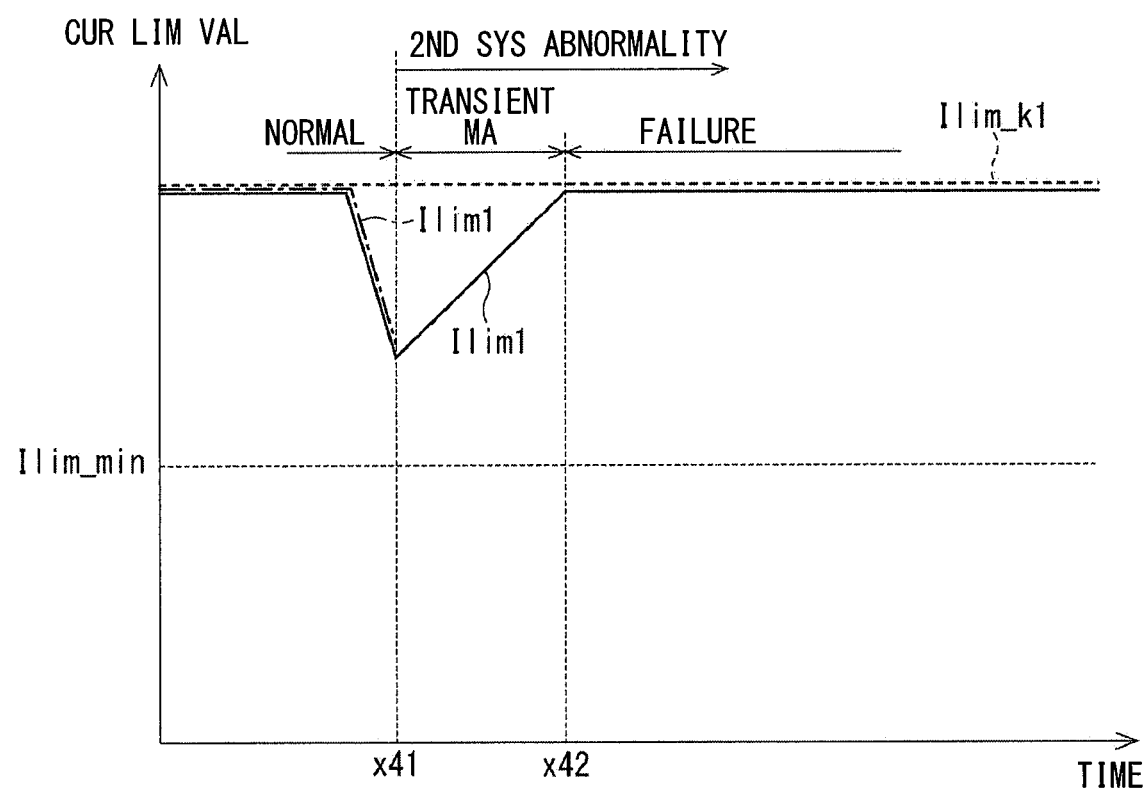
FIG. 34 is a time chart of a current limit value calculation processing according to the eighth embodiment.

An eighth embodiment is shown in FIGS. 33 and 34. In the present embodiment, a sharing or a non-sharing of a current limit value is switched according to a failure state of systems. As shown in FIG. 33, a transition is made to four control modes according to a failure state, to thereby switch between the sharing and the non-sharing of the current limit value.

In a normal mode, the current limit values Ilim1 and Ilim2 are shared by the minimum selection. In the normal mode, the embodiments described above may be combined together, and the current limit values Ilim1 and Ilim2 may be switched between sharing and non-sharing as appropriate.

A failure of the system includes a sensor abnormality, an inter-microcomputer communication abnormality between the microcomputers, and the like. The sensor abnormalities include abnormalities of the temperature sensors 127 and 227, the power supply voltage sensors 117 and 217, and the rotation angle sensors 126 and 226. For example, when the temperature sensor 127 causes an abnormality such as AD-sticking of a thermistor and the temperature of the first system L1 is unreliable, if the individual current limit value Ilim_k1 based on the overheat protection current limit value Ilim_ta1 is shared, the current limit becomes excessive and there is a possibility that a satisfactory output cannot be ensured, so that the current limit values Ilim1 and Ilim2 are not shared and the independent limit control is performed. This also applies to abnormalities of the power supply voltage sensors 117 and 217, the rotation angle sensors 126 and 226, and the like.

When individual current limit values of other systems cannot be acquired due to an error in an inter-microcomputer communication, the current limit values Ilim1 and Ilim2 are not shared, and the independent limit control is performed.

Since the current limit value becomes 0 in the non-driving system, if the current limit values Ilim1 and Ilim2 are shared, the assist may become impossible. Therefore, when it is recognized that another system is in a drive stop state based on the inter-microcomputer communication, the relay drive state of another system, a post-relay voltage, and the like, the current limit values Ilim1 and Ilim2 are not shared, and independent limit control is performed. Incidentally, the "case where the other system is in the drive stop state" includes the case where the system is abnormally stopped, the case before the start of the assist, and the like.

A transition condition C21 is abnormality detection of another system, an inter-microcomputer communication abnormality, or a drive stop of another system. A transition condition C23 is an abnormality resolution of another system, an abnormality resolution of the inter-microcomputer communication, or a drive start of another system. The selection of the current limit mode may be performed by determining another system abnormality, an inter-microcomputer communication abnormality, or other system drive stop in place of the abrupt steering determination in S502 of FIG. 31, and determining other system abnormality resolution, an inter-microcomputer abnormality resolution, or other system driving start in place of the non-abrupt steering determination in S508.

The current limit value calculation processing will be described with reference to a time chart of FIG. 34. Until an abnormality occurs in the second system L2 at a time x41, the control mode is the normal mode, and the current limit mode is the minimum selection.

When the abnormality of the second system L2, the inter-microcomputer communication abnormality, or the drive stop of the second system L2 occurs at a time 41, the control mode is set to the transient mode MA in order to shift the current limit mode to the independent limit control. When the current limit value Ilim1 matches with the individual current limit value Ilim_k1 at a time x42, the control mode becomes the failure mode. The current limit mode at this time is the independent limit control.

In the present embodiment, when an abnormality occurs in another system, when an individual current limit value of another system cannot be acquired, or when another system stops driving, the current limit value calculation units 161 and 261 are set as a current limit value non-sharing mode. As a result, the control of the motor 80 can be appropriately continued without disabling the assist.

Ninth Embodiment

Figure 35:
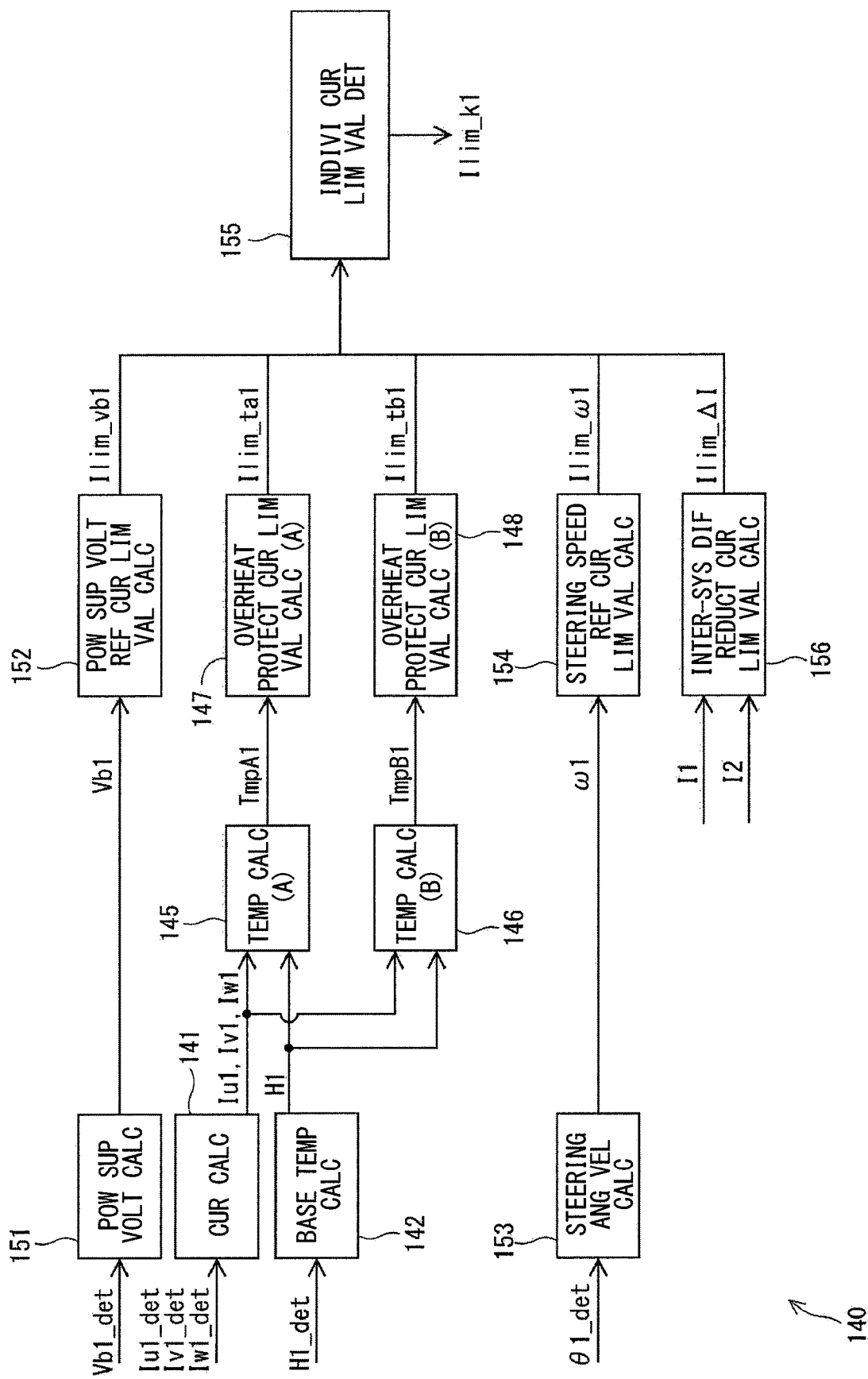
FIG. 35 is a block diagram illustrating an individual current limit value calculation unit according to a ninth embodiment.

A ninth embodiment is shown in FIG. 35. The present embodiment differs from the embodiments described above in the calculation of the individual current limit value. The present embodiment may be combined with any other embodiment. FIG. 35 is a diagram corresponding to FIG. 10, and the individual current limit value calculation unit 140 according to the present embodiment is provided with an inter-system difference reduction current limit value calculation unit 156 in addition to the respective components of the current limit value calculation unit of the embodiments described above. The inter-system difference reduction current limit value calculation unit 156 calculates a current difference reduction current limit value Ilim_ΔI based on a current detection value I1 of the first system L1 and a current detection value I2 of the second system L2.

For example, even when the current limit value is shared by the motor 80 at the time of low output high rotation, an actual currents may not converge to the same value. Further, for example, when a voltage difference between battery voltages Vb1 and Vb2 is large (for example, Vb1>>Vb2), when a relatively large value (for example, 30 [A]) is instructed as the current command value, the current command value becomes larger than the actual current due to the saturation of the duty in both the systems. As a result, the actual currents may not be the same in such a manner that the current detection value I1 of the first system L1 is 15 [A] and the current detection value I2 of the second system L2 is 5 [A]. In that case, for example, the current difference reduction current limit value Ilim_ΔI of the first system L1 to set to 5 [A], so that the actual currents in both the systems can be converged to the same value. In addition, with the use of the current detection value I1 of the host system, the current limit values Ilim1 and Ilim2 of both the systems can be commonized. The same effects as those of the embodiments described above can be obtained even in the above configuration.

Tenth Embodiment

Figure 36:
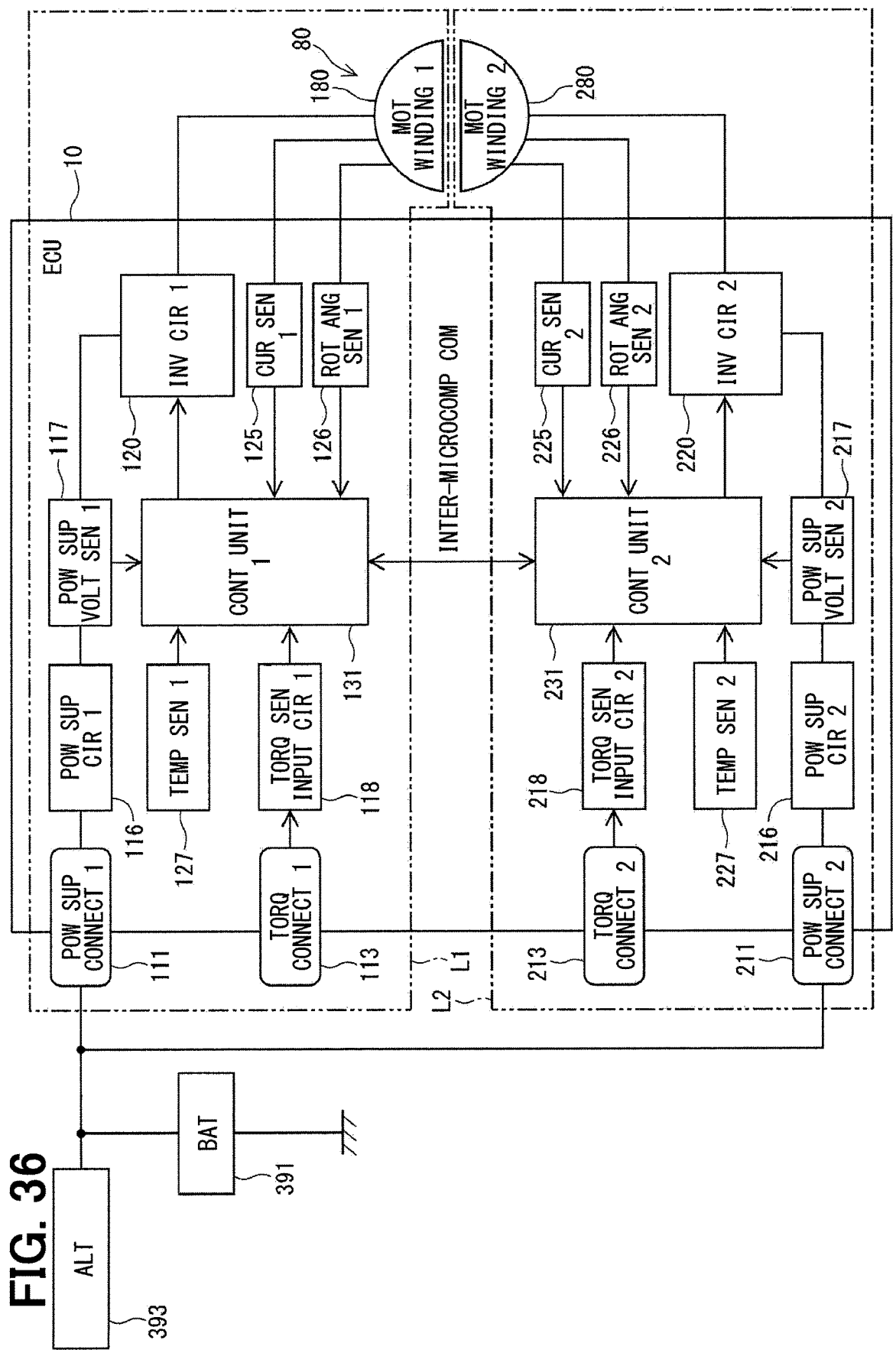
FIG. 36 is a block diagram showing a motor control device according to a tenth embodiment.

A fourth embodiment is shown in FIG. 36. As shown in FIG. 36, in the present embodiment, one battery 391 is connected to power supply connectors 111 and 211. An alternator 393 is connected to the battery 391. In other words, in the present embodiment, the battery 391 and the alternator 393 are shared by the first system L1 and the second system L2. Even in such a case, since wiring resistances and the like are not necessarily equal to each other, detection values Vb1_det and Vb2_det of power supply voltage sensors 117 and 217 may be different from each other. For that reason, the individual current limit values Ilim_k1 and Ilim_k2 are calculated in the same manner as in the embodiments described above. The detailed calculation of the current limit values Ilim1 and Ilim2 may be referred to any of the above embodiments. This configuration also achieves the same effects as those of the above embodiment.

Other Embodiments (a) Individual Current Limit Value

In the embodiments described above, the individual current limit value calculation unit calculates an overheat protection current limit value of a temperature reference, a power supply voltage reference current limit value, a steering speed reference current limit value, and an inter-system difference current limit value, and the smallest value is used as the individual current limit value by the minimum selection. In another embodiment, some of the overheat protection current limit value of the temperature reference, the power supply voltage reference current limit value, and the steering speed reference current limit value may be omitted. In the embodiments described above, the temperature, the battery voltage, and the steering angular velocity are set as parameters involved in the respective systems, and the individual current limit value is calculated based on the parameters. In another embodiment, a part of the temperature, the battery, and the steering angular velocity may be omitted as the parameters involved in the respective systems, or the individual current limit values may be calculated based on other parameters.

In addition, the individual current limit value calculation unit may classify the overheat protection current limit value of the temperature reference, the power supply voltage reference current limit value, the steering speed reference current limit value, and the inter-system difference current limit value into values shared and values not shared between the systems. For example, the steering speed reference current limit value, which is liable to be limited at the time of high-speed steering and has a large influence on an NV improvement, is shared, but the overheat protection current limit value is not shared.

(1) Current Limit Value Calculation Unit

In the embodiments described above, in the current limit value calculation unit, when the individual current limit value of each system is equal to or greater than the limit lower limit value, the smaller value is set as the current limit value. In another embodiment, instead of the minimum value of the individual current limit value of each system, the current limit value may be calculated in any manner on the basis of the individual current limit value of each system, for example, a geometric mean value, an arithmetic mean value, a high selection, or the like. For example, it is effective to use the geometric mean or the arithmetic mean in a case where the detected temperature differs between the systems due to a difference in the sensor position and a temperature involved in the overheat protection is obtained by averaging the detected temperatures. The sudden change of the current limit value can be prevented with the use of an arithmetic mean or a geometric mean.

In another embodiment, in the current limit value calculation unit, when the individual current limit value of one system is smaller than the limit lower limit value, the individual current limit value of another system is set as the limit lower limit value. In another embodiment, for example, when the current limit value is calculated by a method other than the minimum selection method, the limit by the limit lower limit value may not be performed. The limit lower limit value may be maintained at a constant value, or may be variable in accordance with, for example, the steering speed, the battery voltage, the temperature, and the like. For example, at the time of high rotation or low voltage, the limit lower limit value is set to be high, the securing of output can be prioritized over the reduction of NV.

(c) Control Unit

In the embodiments described above, there are two control units. In other embodiments, there may be three or more control units. In other words, the number of systems may be three or more. In addition, a plurality of drive circuits and a plurality of winding sets may be provided for one control unit.

(d) Rotary Electric Machine

In the embodiments described above, the rotary electric machine is a three-phase brushless motor. In another embodiment, the rotary electric machine is not limited to a brushless motor, but may be any motor. The rotary electric machine is not limited to the motor, and may be a generator, or may be a so-called motor generator having the functions of the electric motor and the generator. In the embodiments described above, the drive device is an electro-mechanically integrated type in which the ECU and the motor are integrally provided. In another embodiment, the ECU may be provided separately from the motor as an electro-mechanically separate body.

In the above embodiments, the rotary electric machine control device is applied to the electric power steering device. In other embodiments, the rotary electric machine control device may be applied to devices other than the electric power steering device. As described above, the present disclosure is not limited to the embodiments described above, and can be implemented in various forms without departing from the spirit of the present disclosure.

The present disclosure has been described in accordance with the embodiments. However, the present disclosure is not limited to the above embodiments and the above structures. The present disclosure also encompasses various modifications and variations within the scope of equivalents. Also, various combinations and forms, as well as other combinations and forms that include only one element, more, or less, are within the scope and spirit of the present disclosure.

The invention claimed is:

1. A rotary electric machine control device for controlling driving of a rotary electric machine including a plurality of winding sets, the rotary electric machine control device comprising:
   a plurality of drive circuits, a unit of components including one of the winding sets and a corresponding one of the drive circuits being defined as a system;
   a plurality of control units, each of which includes: an individual current limit value calculation unit that calculates an individual current limit value as a value relating to a current limitation for each system; a current limit value calculation unit that sets a current limit value based on the individual current limit value; and a control signal calculation unit that calculates a control signal based on a current command value calculated according to the current limit value, and outputs the control signal to a corresponding drive circuit, wherein:
   the current limit value calculation unit switches between a current limit value sharing mode for matching the current limit values between a host system and an other system and a current limit value non-sharing mode for setting the current limit values independently in the host system and the other system.

2. The rotary electric machine control device according to claim 1, wherein:
   the current limit value calculation unit sets a smallest value of the individual current limit values in the systems as the current limit value in the current limit value sharing mode.

3. The rotary electric machine control device according to claim 1, wherein:

the current limit value calculation unit switches to the current limit value sharing mode when all of the individual current limit values of the systems are equal to or more than a predetermined lower limit value, and the current limit value calculation unit switches to the current limit value non-sharing mode when at least one of the individual current limit values of the systems is less than the predetermined lower limit value.

4. The rotary electric machine control device according to claim 3, wherein:

the current limit value calculation unit redefines the current limit value of one of the systems in which the individual current limit value is equal to or more than the predetermined lower limit value in the current limit value non-sharing mode as the predetermined lower limit value.

5. The rotary electric machine control device according to claim 1, wherein:

the current limit value calculation unit gradually increases the current limit value to the individual current limit value of the host system when transitioning from the current limit value sharing mode to the current limit value non-sharing mode.

6. The rotary electric machine control device according to claim 1, wherein:

the current limit value calculation unit gradually changes the current limit value to match a shared current limit value when transitioning from the current limit value non-sharing mode to the current limit value sharing mode.

7. The rotary electric machine control device according to claim 1, wherein:

the current limit value calculation unit switches to the current limit value non-sharing mode at an output prioritized time when an output from the rotary electric machine is prioritized.

8. The rotary electric machine control device according to claim 1, wherein:

the current limit value calculation unit switches to the current limit value non-sharing mode when an abnormality occurs in the other system, when the individual current limit value of the other system is not obtained, or when the other system stops driving.

9. The rotary electric machine control device according to claim 1, wherein:

the control signal calculation unit executes a sum and difference control for generating the control signal to set a current sum of the systems to a current sum command value and to set a current difference of the systems to a current difference command value when the current command values in the systems match with each other; and the control signal calculation unit executes an independent driving control for generating the control signal based on the current command value of the host system when the current command values in the systems do not match with each other.

10. An electric power steering device comprising:

the rotary electric machine control device according to claim 1;

the rotary electric machine that outputs an assist torque for assisting a steering operation of a steering wheel by a driver; and a power transmission unit that transmits a driving force of the rotary electric machine to a drive target.

* * * * *